United States Patent [19]
Maki et al.

[11] Patent Number: 5,972,097
[45] Date of Patent: Oct. 26, 1999

[54] METHOD OF MANUFACTURING INORGANIC PIGMENT

[75] Inventors: Toyotaro Maki; Shuzo Mihara; Shigeru Suzuki, all of Osaka, Japan

[73] Assignee: Ferro Enamels (Japan) Limited, Osaka, Japan

[21] Appl. No.: 08/945,596

[22] PCT Filed: Mar. 25, 1997

[86] PCT No.: PCT/JP97/01001

§ 371 Date: Oct. 27, 1997

§ 102(e) Date: Oct. 27, 1997

[87] PCT Pub. No.: WO97/35928

PCT Pub. Date: Oct. 2, 1997

[30] Foreign Application Priority Data

| Mar. 26, 1996 | [JP] | Japan | 8-70638 |
| Feb. 12, 1997 | [JP] | Japan | 9-28185 |
| Feb. 12, 1997 | [JP] | Japan | 9-28186 |
| Feb. 12, 1997 | [JP] | Japan | 9-28200 |

[51] Int. Cl.⁶ ..................... C09C 1/36
[52] U.S. Cl. ............ 106/428; 106/425; 106/430; 106/440; 106/441; 106/480
[58] Field of Search ................ 106/428, 440, 106/441, 480, 425, 430

[56] References Cited

U.S. PATENT DOCUMENTS

| 3,671,765 | 6/1972 | Hardtl | 310/311 |
| 4,696,700 | 9/1987 | Fischer et al. | 106/415 |
| 5,055,440 | 10/1991 | Chu et al. | 502/303 |
| 5,093,301 | 3/1992 | Chu et al. | 502/303 |
| 5,198,025 | 3/1993 | Dausch | 106/429 |
| 5,521,137 | 5/1996 | Martin et al. | 502/311 |

FOREIGN PATENT DOCUMENTS

| 52-123425 | 10/1977 | Japan . |
| 59-21504 | 2/1984 | Japan . |
| 59-217625 | 12/1984 | Japan . |
| 3-8728 | 1/1991 | Japan . |
| 4-292417 | 10/1992 | Japan . |
| 7-100402 | 4/1995 | Japan . |

*Primary Examiner*—Mark L. Bell
*Assistant Examiner*—Scott L. Hertzog
*Attorney, Agent, or Firm*—Jordan and Hamburg LLP

[57] ABSTRACT

The invention provides a method for producing colorful inorganic pigments, which comprise complex oxides of various elements, which have good weather resistance and good heat resistance, and which are widely used in colorants for ceramics and in colorants for coatings and plastics. In the method, the composite oxides are sintered at a low temperature for a short period of time to give homogeneous and well colored pigments. Under the sintering conditions, the composite oxides are not sintered excessively. The grinding step in the method is simplified. The method comprises mixing oxides of elements to constitute specific inorganic pigments, or compounds that can be converted into such oxides under heat, in predetermined ratios, followed by calcining the resulting mixtures, and is characterized in that the raw materials are dry-processed in a grinding machine, without being subjected to said mixing step, to thereby give to the raw materials sufficient energy enough to induce the mechanochemical reaction of the materials to compound them into composite particles comprising the raw materials in the compounding ratios.

7 Claims, 15 Drawing Sheets

TiO$_2$-CoO-NiO-ZnO Composite Particles

Co(OH)$_2$   ZnO
NiCO$_3$   TiO(OH)$_2$

: $TiO_2\text{-}Sb_2O_5\text{-}Co(OH)_2$ Composite Particles

FIG. 15
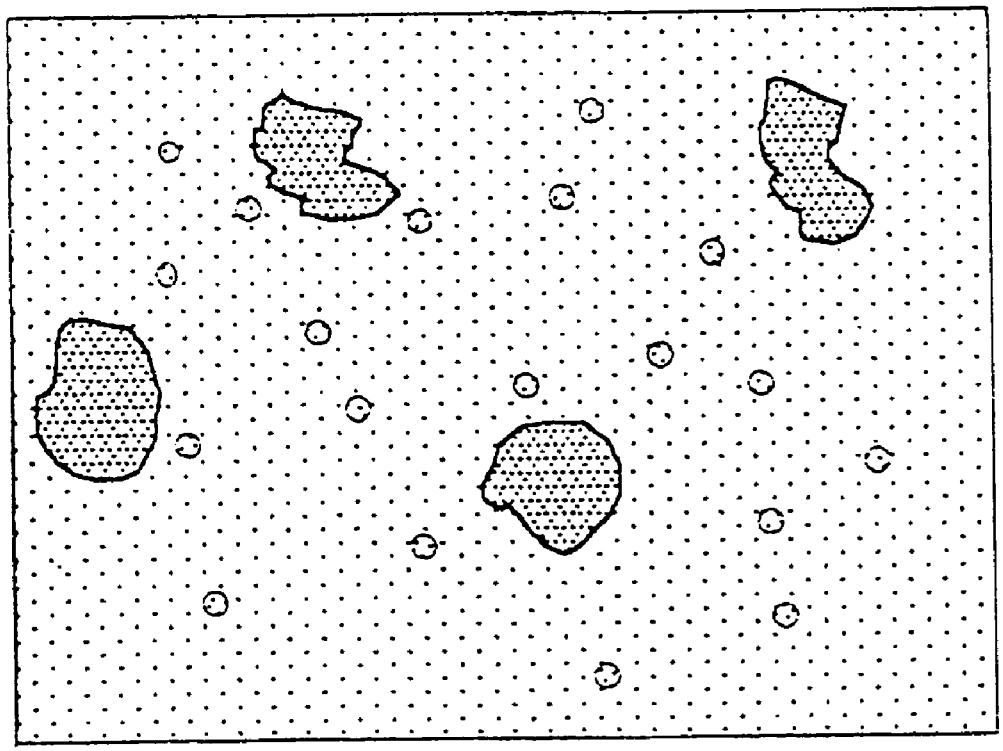

FIG. 21
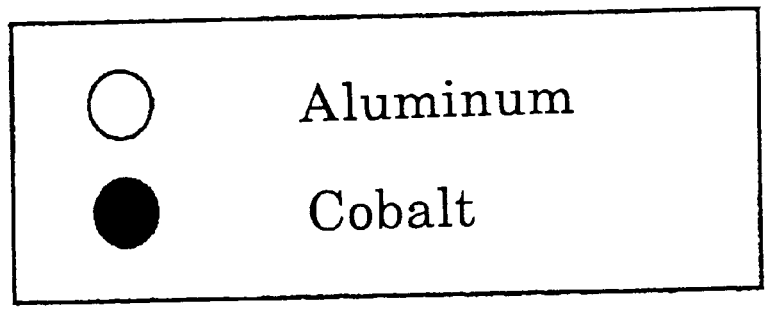
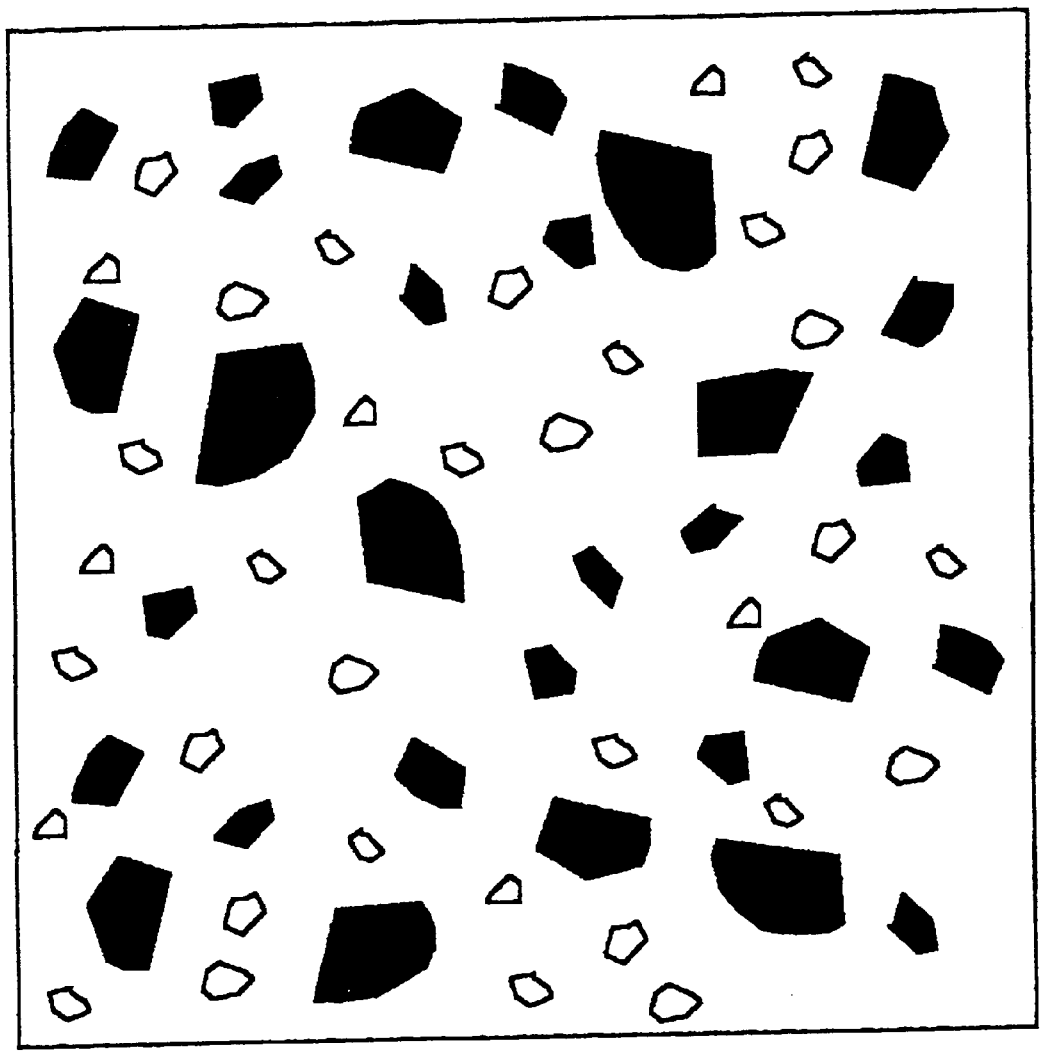

he present invention relates to a method for producing
METHOD OF MANUFACTURING INORGANIC PIGMENT

TECHNICAL FIELD

The present invention relates to a method for producing colorful inorganic pigments, which comprise complex oxides of various elements, which have good weather and heat resistance, and which are widely used, for example, in colorants for ceramics and in colorants for coatings and plastics.

BACKGROUND ART

Heretofore, various means have been employed and proposed for the production of inorganic pigments comprising complex oxides.

One general method for the production comprises mixing oxides containing elements that constitute specific inorganic pigments, or compounds that can be converted into such oxides under heat, in predetermined ratios, then calcining the resulting mixtures into complex oxides, and grinding the complex oxides.

With this method, however, since the solid state reaction during the sintering starts from the contact points of the starting particles, the intended solid state reaction is often uneven and incomplete, resulting in uneven color and tone in the pigments obtained. Therefore, in order to obtain homogeneously and satisfactorily colored pigments according to this method, the heating temperature must be increased and the heating time must be greatly prolonged. However, this not only adds to energy costs but also enlarges the sintered particles because of the lapse of heating time, resulting in further mechanical energy being expended in the step of grinding such large particles. This method is problematic in such points.

Another known method comprises wet-milling the starting materials for a long period of time to produce a satisfactorily homogeneous mixture of ultra-fine particles, followed by calcining this mixture. In this method, heating time can be shortened to some degree. However, the introduction of impurities, caused by the abrasion of the milling tank and the milling media used, into the mixture is inevitable, and the impurities negatively influence the quality of the pigments thus obtained.

In yet another known method, a flux of fluoride, a chloride or the like is used for the purpose of lowering the heating temperature for the calcining of powdery raw materials. However, this is problematic in that the raw materials are sintered very unevenly and the sintered particles grow too much.

In still another known method, a co-precipitation of particles is used. For example, a means of co-precipitation is disclosed in Japanese Unexamined Patent Publication No. 3-8728, in which more homogeneous pigments may be obtained through co-precipitation of particles. However, the disclosed method comprises complicated steps whereby production costs are increased.

One object of the present invention is to provide a simple method for producing homogeneous, satisfactorily colored, inorganic pigments comprising complex oxides.

Another object of the present invention is to provide a simple method for producing homogeneous, satisfactorily colored, inorganic pigments comprising complex oxides, in which the calcining step is effected at a low temperature for a shortened period of time without overly enlarging the sintered particles, and where the grinding step is thereby simplified.

Yet another object of the present invention is to establish a method for producing homogeneous, satisfactorily green-colored, inorganic pigments comprising complex oxides of titanium, cobalt, nickel and zinc, through calcining of raw materials at a low temperature for a shortened period of time.

Still another object of the present invention is to establish a method for producing homogeneous, satisfactorily yellow-colored, inorganic pigments having a rutile structure that comprises a solid solution of titanium oxide with one or more oxides of cobalt, chromium and nickel and one or more oxides of antimony, tungsten and niobium, through calcining of raw materials at a low temperature for a shortened period of time.

Still another object of the present invention is to establish a method for producing homogeneous, satisfactorily colored, highly transparent cobalt blue pigments, through calcining of raw materials at a low temperature for a shortened period of time.

DISCLOSURE OF THE INVENTION

The present invention is a method for producing inorganic pigments in which oxides of elements that constitute specific inorganic pigments, or compounds that can be converted into such oxides under heat, are mixed in predetermined ratios, and the resulting mixtures are calcined; and the method is characterized in that the raw materials are dry-processed in a grinding machine, without being subjected to said mixing step, to thereby give to the raw materials sufficient energy to induce the mechanochemical reaction of the materials to compound them into composite particles comprising the raw materials in the compounding ratios.

In this mechanochemical reaction, the raw material particles are firmly compounded together, while, at the same time, the surfaces of the raw material particles are amorphatized. In addition, in this step, the raw materials are compounded and ground at the same time, by which means the composite particles formed are prevented from enlarging.

The particles as obtained through the above-mentioned compounding treatment are composite particles where the individual particles of elements constituting specific inorganic pigments have been firmly compounded together and where the elements exist in predetermined ratios corresponding to the compounding ratios of the raw materials used, and these composite particles are not crystalline but have been forced to be more reactively amorphous. Specifically, as a result of the above-mentioned treatment, the number of contact points of each individual particle, that is, the number of reactive points thereof, which is an important factor in the speed of the solid state reaction of the particles, is increased to a large degree. In addition, the composite particles as amorphatized through said treatment are made more reactive in the subsequent reaction. Accordingly, the process of producing composite particles of that type does not require that the heating step be effected at a high temperature for a long period of time, said heating step being indispensable in conventional methods. According to this process, therefore, it is possible to obtain homogeneous and satisfactorily colored, inorganic pigments even under low heating conditions under which the sintering of the pigment particles could not formerly be promoted well.

The effects of this mechanochemical reaction and the phenomena in said reaction can be confirmed through the results of X-ray diffraction to show the degree of amorphatization of the composite particles, through the data of thermal analysis such as TG-DTA/DSC of the composite particles to show the disappearance and the movement of the exothermic and endothermic peaks for the non-compounded particles, and through the data from measurements of specific surface areas of the composite particles to decrease.

The mechanochemical reaction itself is known, and it is known that this reaction is applicable, for example, to the surface modification of powdery materials and to the production of high-temperature superconducting materials. However, there is known no example of applying the reaction to the production of inorganic pigments such as green inorganic pigments that comprise complex oxides of a spinel structure as composed of oxides of elements of titanium, cobalt, nickel and zinc; and nothing is known at all as to what characteristics the inorganic pigments to be obtained through the reaction may have.

As the starting materials for the present invention, usable are any oxides containing elements that constitute specific inorganic pigments, or even any compounds which can be converted into such oxides under heat. In particular, however, of the starting materials to be used for the production of green inorganic pigments, a combination of cobalt hydroxide as the cobalt source and nickel carbonate as the nickel source is preferred as it easily provides amorphatized composite particles even when low energy is applied thereto.

On the other hand, of the raw materials to be used for the production of rutile-type yellow inorganic pigments, a combination of cobalt hydroxide as the cobalt source, chromium hydroxide as the chromium source and nickel carbonate as the nickel source is preferred, also as it easily provides amorphatized composite particles even under low energy conditions.

For the production of cobalt blue pigments, preferred as starting materials are a combination of cobalt hydroxide or cobalt carbonate as the cobalt source and aluminum hydroxide or γ-alumina as the aluminum source, as they provide highly transparent pigments.

The grinding machine to be used herein for compounding the raw material powders to provide composite particles is not specifically defined. For example, any rotary ball mill, vibrating mill, mortar mill, impact mill, roller mill, disc mill, pin mill, media-stirring mill (attritor), planetary mill, etc. may be used. Of these, however, vibrating mills, media-stirring mills and planetary mills having grinding mechanisms that grind materials through attrition are preferred, as they easily induce the intended mechanochemical reaction. For the grinding machines using grinding media, any rod, cylinder or ball can be used as the grinding media. Desirably, however, the compounding treatment with such machines is conducted under conditions under which the attrition effects are increased. For example, for vibrating mills and planetary mills, balls having a diameter of from 1.1 to 2.0 times that of the balls suitable for grinding materials into fine powders are used, or the amount of the balls to be used therein is increased by 10 or 20%, whereby the grinding effects can be increased easily.

During the compounding treatment, it is effective to add a small amount of a liquid aid to the system in order to prevent the materials being ground from adhering to the grinding media. For this, for example, ethanol, propanol and the like as are generally and widely used as dry-grinding aids are preferred. The amount of the aid to be added is desirably from 0.05% by weight to 5.0% by weight relative to the total amount of the raw materials to be ground.

In addition, for the compounding treatment, organic materials capable of being adsorbed by inorganic materials of raw materials on their surfaces and having a viscosity sufficient for acting as binders are especially effective as aids for attaining the intended compounding of particles under low energy conditions. For example, from the viewpoint of their adsorbability onto the surfaces of inorganic materials, preferred are organic materials having a plurality of hydroxyl groups or carboxyl groups in one molecule. Concretely, such organic materials include polyalcohols such as ethylene glycol, propylene glycol, glycerin; alcoholic amines such as diethanolamine, triethanolamine; and dicarboxylic acids and polycarboxylic acids having a plurality of carboxyl groups in one molecule. Where the organic materials that are intended to be used for this purpose are solid at room temperature or have a too high viscosity, they are diluted with water or other solvents to give solutions having a viscosity of 10 centipoises to 500 centipoises. This viscosity range is one suitable for making the diluted solutions uniformly disperse throughout the raw material particles being ground. The amount of the solution to be added may be from 0.05% by weight to 5.0% by weight, preferably from 0.5% by weight to 2.0% by weight relative to the total amount of the raw materials being ground. If the amount is larger than 5.0% by weight, most of the raw materials adhere, without being processed, onto the inner wall of the grinding tank or onto the grinding media in the initial stage of the compounding treatment process, and the adhered materials interfere with the subsequent treatment. If, on the other hand, the amount is smaller than 0.05% by weight, the effect of the aid added would be slight. The use of the aid improves the treatment efficiency and, as the case may be, makes it possible to treat the raw materials within a practical and short period of time, even in low-energy grinding machines that would require a long time for compounding the raw materials in the absence of the aid.

BRIEF DESCRIPTION OF THE DRAWINGS

FIG. 15 is a view to graphically show the morphology of the mixture as obtained through the mixing treatment in Comparative Example 2, based on the data of the EDX analyses of the mixture.

FIG. 21 is a view to graphically show the morphology of the mixture as obtained through the wet-grinding treatment in Comparative Example 4, based on the data of the EDX analyses of the mixture.

BEST MODES OF CARRYING OUT THE INVENTION

The following Example 1 and Example 2 are to demonstrate the present invention as applied to the production of green inorganic pigments.

EXAMPLE 1

100 g of metatitanic acid, 48.3 g of cobalt hydroxide, 135.8 g of nickel carbonate and 42.2 g of zinc oxide were weighed and mixed, the latter three being based on the weight of the first one, and dry-compounded for 2 hours in a vibrating ball mill (MB-1 Model; produced by Chuo Kako-ki Co.). The containers used herein were nylon pots (3.0 liters); 5.0 kg of 25 mmφ-alumina balls were used as the grinding media; and the amount of the raw material mixture fed into the mill was 100 g.

Figure 1:
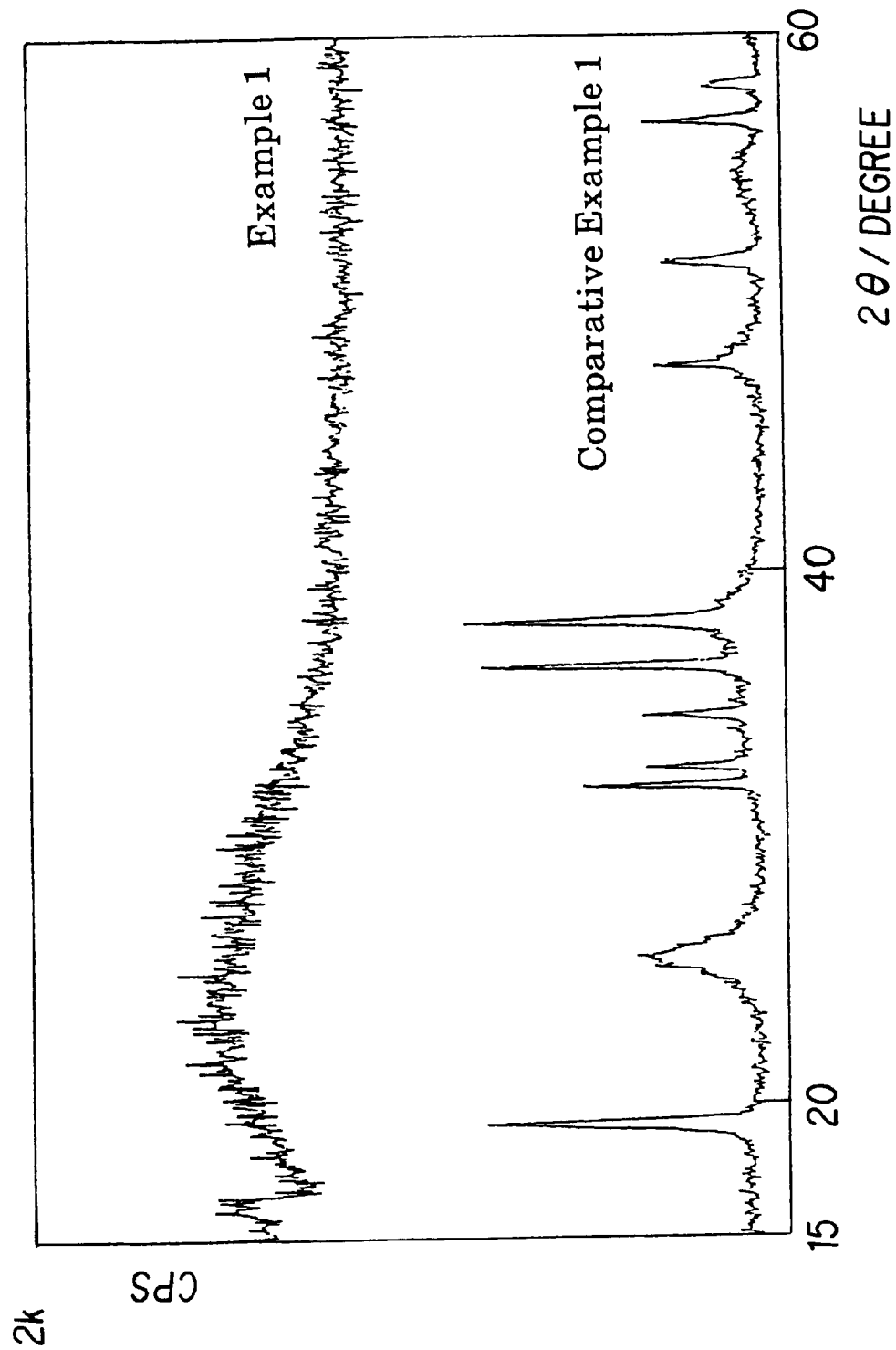
FIG. 1 shows the X-ray diffraction profiles of the powdery particles as obtained through the compounding treatment in Example 1 of the invention and the mixture as obtained through the wet-grinding treatment in Comparative Example 1.

The product was subjected to X-ray diffraction analysis, using an X-ray diffraction device (RAD III Model; produced by Rigaku Denki Co.). FIG. 1 shows the resulting X-ray diffraction profile of the powdery particles as obtained through the above-mentioned compounding treatment. From this, it is known that the product obtained herein comprised powdery particles resulting from extreme amorphatization of the raw materials.

Figure 2:
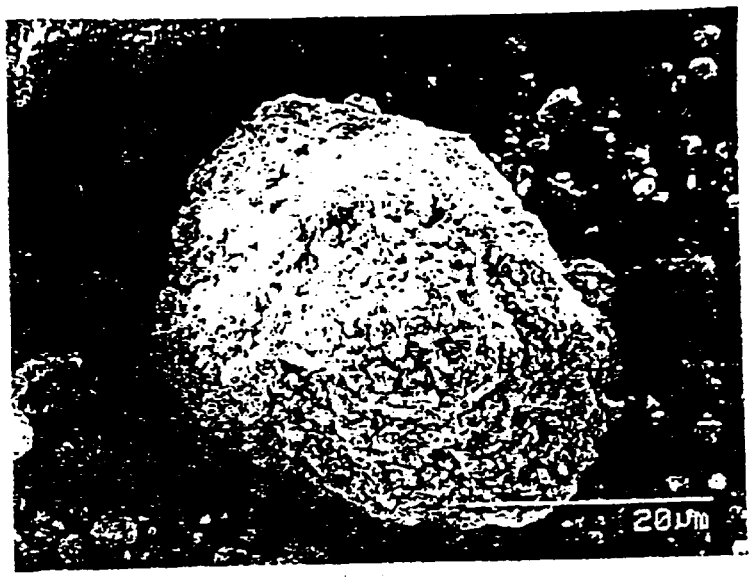
FIG. 2 is an electromicroscopic photograph of the surface of the particles as obtained through the compounding treatment in Example 1 of the invention, and is a substitute for the drawing of said particles.
Figure 3:
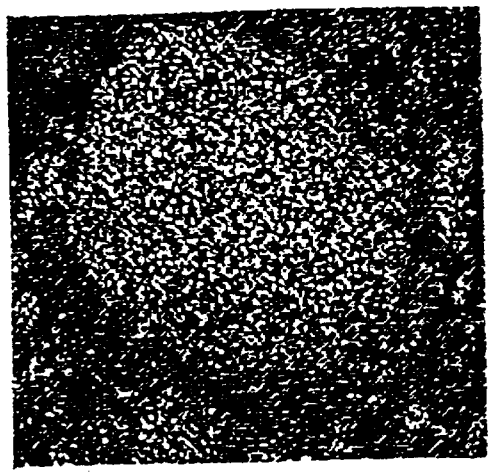
FIG. 3 is an X-ray image (EDX lateral analysis) of the particles as obtained through the compounding treatment in Example 1 of the invention, showing the distribution of titanium elements in the particles.
Figure 4:
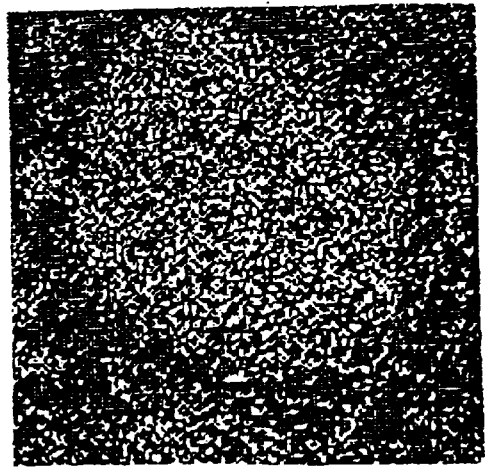
FIG. 4 is an X-ray image (EDX lateral analysis) of the particles as obtained through the compounding treatment in Example 1 of the invention, showing the distribution of cobalt elements in the particles.
Figure 5:
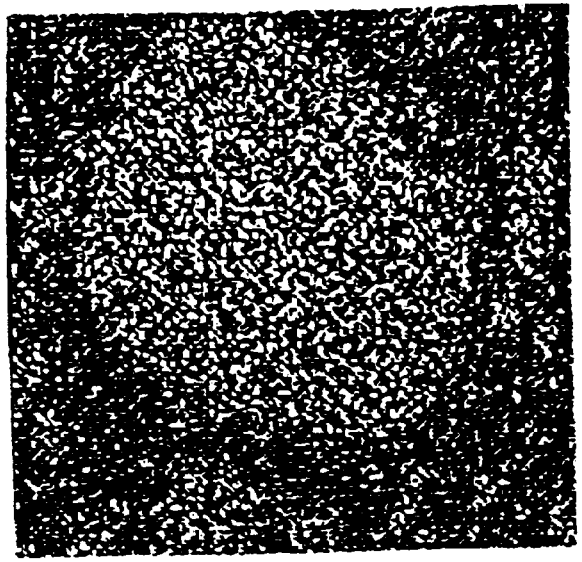
FIG. 5 is an X-ray image (EDX lateral analysis) of the particles as obtained through the compounding treatment in Example 1 of the invention, showing the distribution of nickel elements in the particles.
Figure 6:
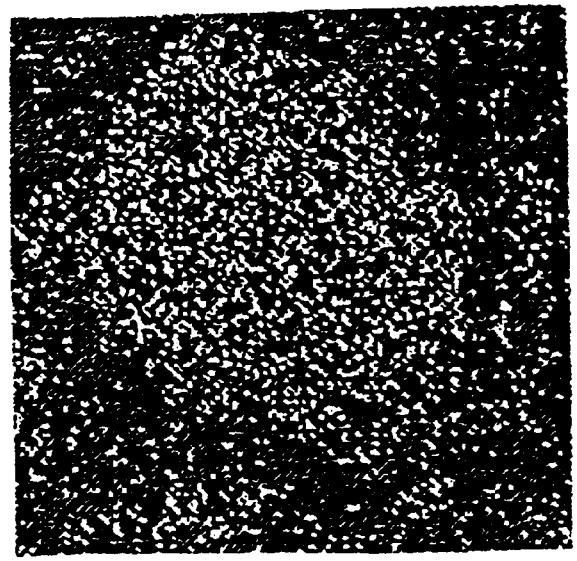
FIG. 6 is an X-ray image (EDX lateral analysis) of the particles as obtained through the compounding treatment in Example 1 of the invention, showing the distribution of zinc elements in the particles.

FIG. 2 is an electromicroscopic photograph of the particles as taken with a scanning electronic microscope, S-2300 Model (produced by Hitachi Ltd.), in which it was observed that a plurality of raw material particles were firmly compounded to give secondary particles that had grown several tens of times.

The product was subjected to EDX analysis, using an energy dispersive X-ray microanalyzer, EMAX-3700 Model (produced by Horiba Seisaku-sho Co.). FIG. 3 to FIG. 6 are the resulting X-ray images, each showing the distribution of the metal elements, titanium, cobalt, nickel and zinc, respectively. From these, it is understood that the secondary particles formed herein are composite particles comprising all the elements, titanium, cobalt, nickel and zinc.

Figure 7:
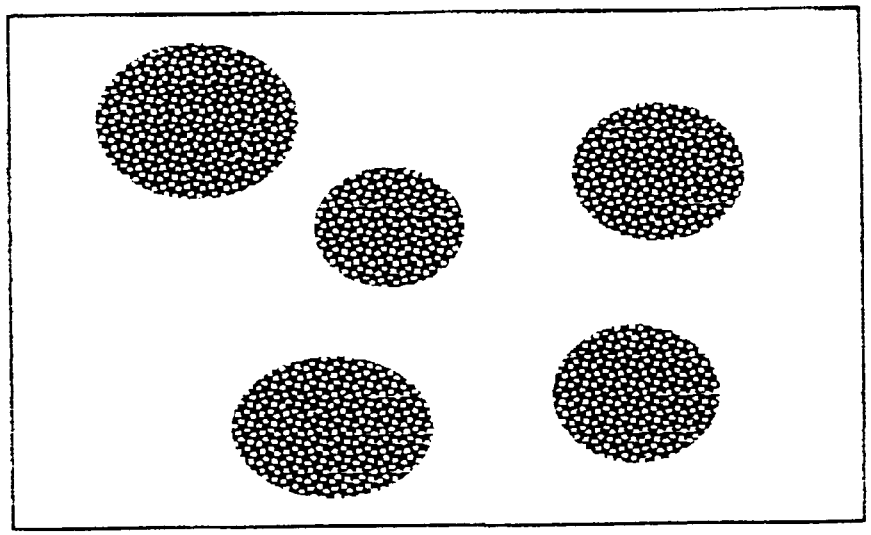
FIG. 7 is a view to graphically show the morphology of the powdery composite particles as obtained through the compounding treatment in Example 1 of the invention, based on the data of the EDX analyses of the particles.

Thus, according to the method of the present invention of compounding the raw materials, obtained herein were composite particles consisting of well amorphatized and firmly compounded particles and comprising all the metal elements to be derived from the starting materials. FIG. 7 is a view to graphically show the morphology of the powdery composite particles obtained herein.

Next, the powdery composite particles were calcined in a roller hearth furnace in air at from 800° C. to 1100° C. for 1 hour, and the resulting sintered product was ground into particles of not larger than 1 μm in size, and then mixed with a vehicle. The mixture was spread over a base and its color was measured. The process for the color measurement is as follows:

Process of Color Measurement:

The following components in the ratio by weight mentioned below were mixed in a small bottle (70 cc), and dispersed for 20 minutes using a paint shaker (5400 Model Paint Conditioner; produced by Red Devil Co.).

| | |
|---|---|
| Sample of the product (not larger than 1 μm in size) | 4 g |
| Glass beads (Unibeads UB-2527L; produced by Union Co.) | 45 g |
| Acrylic resin (Nippeacryl Autoclear Super) | 40 g |
| Thinner | 2 g |

The resulting dispersion was spread over art paper, using an applicator (150 μm), and its color was measured using a spectrophotometer (Colorcom System; produced by Dainichi Seika Kogyo Co.), while being compared with a modified Munsell color system (HVC). Based on the comparison, the products obtained herein were evaluated.

Modified Munsell Color System:

The hue circle that is used at present for indicating colors comprises 10 hues (R, YR, Y, GY, G . . . ) each divided into four to comprise 40 color types in total. For example, for green colors, their H (hue) values are represented by 7.5GY, 10GY, 2.5G and 5G, indicating from deep yellowish green to pale yellowish green. Referring to green inorganic pigments, those falling between 2.0G and 2.7G are most widely used. Pigments having an H (hue) value of 2.0G are yellowish green pigments; while those having an H (hue) value of 2.7G are deep green pigments.

The value of lightness (V) ranges between 1 and 10. In general, substances having the value of lightness of being nearer to 10 have a higher degree of whiteness. The chroma (C) ranges between 0 and 16, and substances having a larger value of C are more vivid.

Table 1 shows the heating temperature and time, and the data of the value H (hue) as determined in accordance with the modified Munsell color system.

extremely fine primary particles. In this Comparative Example 1, composite particles such as those obtained in Example 1 could not be formed.

Next, this mixture was calcined in a roller hearth furnace in air at from 900° C. to 1100° C. for 1 hour or 4 hours. The resulting sintered products were processed in the same manner as in Example 1, and their colors were determined.

Table 1 shows the heating temperature and time for calcining, and the data of the value H (hue) as determined in accordance with the modified Munsell color system.

TABLE 1

| | Temperature (° C.) | Time (hr) | Uneven Sintering | Color of Sintered Product (visual observation) | Values in Modified Munsell Color System | | |
|---|---|---|---|---|---|---|---|
| | | | | | H (hue) | V (value of lightness) | C (chroma) |
| Example 1 | 800 | 1 | No | Not colored well | — | — | — |
| | 850 | 1 | No | Vivid green | 2.41 G | 4.75 | 7.72 |
| | 1050 | 1 | No | Vivid green | 2.65 G | 4.87 | 8.08 |
| | 1100 | 1 | No | Vivid green | 2.27 G | 4.71 | 7.92 |
| Comparative Example 1 | 900 | 4 | Yes | Not colored well | — | — | — |
| | 1000 | 4 | Yes | Not colored well | — | — | — |
| | 1050 | 1 | Yes | Dull yellow green | 1.05 G | 4.79 | 5.78 |
| | 1050 | 4 | Yes, but a little | Yellowish green | 1.98 G | 4.72 | 7.68 |
| | 1100 | 1 | Yes | Yellowish green | 1.34 G | 4.74 | 6.66 |
| | 1100 | 4 | No | Vivid green | 2.24 G | 4.68 | 8.18 |

When heated at 800° C. for 1 hour, well-colored pigments could not be obtained. However, when heated at temperatures falling between 850° C. and 1050° C. for 1 hour, at which the composite particles could not be sintered sufficiently, highly homogeneous, deep green pigments having a value H (hue) from 2.41G to 2.65G were obtained. When heated at 1100° C. for 1 hour, vivid green pigments were obtained. However, since the heating temperature was so high, the particles were overly sintered, resulting in a prolonged time needed for grinding the sintered product to prepare coloring compositions.

Comparative Example 1

For comparison, the same starting materials as those in Example 1 were mixed in the same ratio as in Example 1, wet-ground in a rotary ball mill (pot mill), and calcined.

The conditions for the wet-grinding were as follows: As the containers, nylon pots (2.0 liters) were used. As the grinding media, 3.0 kg of 5 mmφ-alumina balls were used. 200 g of the raw material mixture was put into the mill along with 0.8 liters of water, and wet-ground therein continuously for 6 hours. The resulting slurry was dried at 100° C. for 48 hours.

The X-ray diffraction profile of the thus-dried mixture is shown in FIG. 1. As seen from this, the particles were not amorphatized, being different from the powdery composite particles obtained in Example 1.

The surfaces of the particles obtained herein were observed with an electronic microscope. However, the formation of secondary particles, such as those seen in Example 1, could not be admitted in these.

Figure 8:
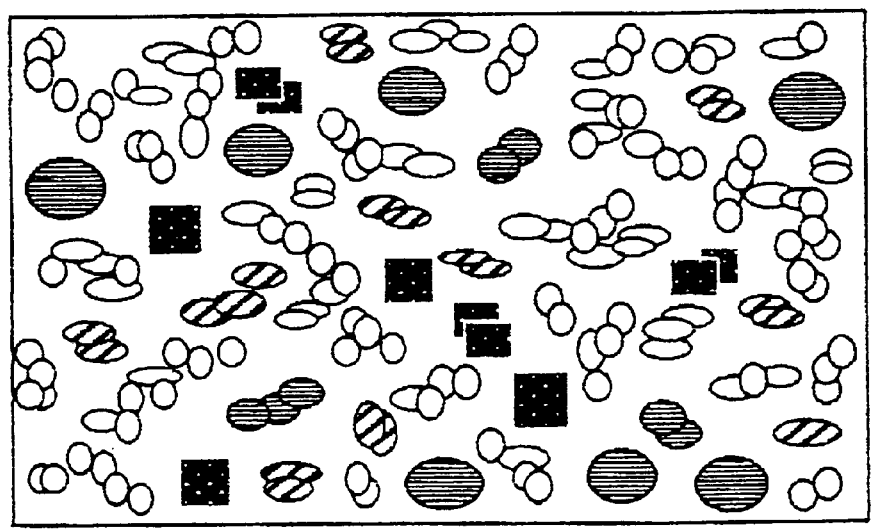
FIG. 8 is a view to graphically show the morphology of the mixture as obtained through the wet-grinding treatment in Comparative Example 1, based on the data of the EDX analyses of the mixture.

FIG. 8 is a view to graphically show the data of the EDX analysis of the mixture. As in this, the mixture comprised When heated at the predetermined temperature for 1 hour, the sintered products were uneven and were yellowish green. In order to obtain homogeneous and well colored, sintered products, the mixture must be heated at 1050° C. or higher for 4 hours or longer. On the other hand, the sintered products as obtained through heating for 4 hours comprised many large particles that had grown during the sintering, and a great deal of time was needed to grind them.

EXAMPLE 2

Any of ethanol, propylene glycol, polycarboxylic acid (Disperon 2150; produced by Kusunoki Kasei Co.), triethanolamine, diethanolamine or monoethanolamine were used herein as an aid, directly or after having been diluted with ethanol to have a predetermined viscosity. These are referred to as aid (A) to aid (H). The same starting material mixture as that in Example 1 was compounded in the same manner as in Example 1, except that one of these aids (A) to (H) was added to the mill at the same time as 100 g of the mixture was put into the mill. In this, however, the processing time was from 0.5 hours to 2 hours; and one of aid (A) to aid (H), was added to the mill 1% by weight of the total amount of the mixture. As the aid (H'), 10% by weight of the aid (H) was added to the mill.

Next, the powdery composite particles obtained through the above-mentioned process were calcined in a roller hearth furnace in air at 850° C. for 1 hour.

The degree of coloration of each sintered product was measured and compared with that of the corresponding product as calcined in the absence of the aid in Example 1.

In Table 2 are shown the components of the aids (A) to (H') used, their viscosity (centipoises at 20° C.), and the degree of coloration of each sintered product.

TABLE 2

|  | Aid (organic substance/solvent) Relative to the total amount of the raw material mixture, 1 wt. % of A to H or 10 wt. % of H' was added. | Viscosity of Solution (20° C.) | Degree of Coloration relative to Processing Time | | | |
|---|---|---|---|---|---|---|
|  |  |  | 0.5 hrs | 1 hr | 1.5 hrs | 2 hrs |
| Example 1 | Not added |  | x | x | x | ○ |
| Example 2 | A. Ethanol | 1.2 cps | x | x | Δ | ○ |
|  | B. Propylene glycol/ethanol | 8 | x | x | Δ | ○ |
|  | C. Monoethanolamine/ethanol | 110 | x | x | Δ | ○ |
|  | D. Diethanolamine/ethanol | 108 | x | Δ | ○ | ○ |
|  | E. Propylene glycol | 22 | x | Δ | ○ | ○ |
|  | F. Polycarboxylic acid (Disperon 2150) | 254 | x | ○ | ○ | ○ |
|  | G. Triethanolamine | 494 | x | ○ | ○ | ○ |
|  | H. Triethanolamine/ethanol | 266 | x | Δ | ○ | ○ |
|  | H'. 10 wt. % of H added | 266 | x | x | x | x |

○: Good
Δ: Relatively good
x: Bad
Calcining Condition: at 850° C. for 1 hour

When any of the aids (D) to (H), having a viscosity falling between 10 centipoises and 500 centipoises and comprising an organic substance having two or more hydroxyl and/or carboxyl groups in one molecule was added, the same results as in Example 1 were obtained herein through the compounding treatment for 1 hour or 1.5 hours. From this, it is understood that the addition of any of the aids (D) to (H) shortened the processing time, that is, reduced the energy needed for processing, as compared with the case of Example 1 where no aid was added. For the other aids (A), (B) and (C), however, such significant improvements as were obtained in the use of the aids (D) to (H) could not be attained. This is because the aids (A) and (C) having only one hydroxyl group in one molecule have poor adsorbability onto the surfaces of the inorganic particles and could not act as binders. In other words, these aids could not directly assist the inorganic particles in compounding together to provide the intended composite particles. On the other hand, even for organic substances having 2 or more hydroxyl groups in one molecule, such as the aid (B), they could not directly assist the inorganic particles in compounding together to provide the intended composite particles, if their viscosity was not suitable for them to act as binders.

Regarding the case of the aid (H') corresponding to the addition of 10% by weight of the aid (H), satisfactory coloration could not be obtained even after a compounding treatment of 2 hours. This is because, since the amount of aid added was too large, most of the raw materials adhered, without being processed, onto the inner wall of the pot and onto the alumina balls in the initial stage of the compounding treatment step, and the adhered materials interfered with the subsequent treatment.

The following Examples 3 to 5 are to demonstrate the present invention as applied to the production of rutile-structured yellow inorganic pigments.

EXAMPLE 3

TABLE 3

| Sample | $TiO_2$ 0.99 $TiO_2$ wt. pts. | $Co(OH)_2$ 0.80 CoO wt. pts. | $Cr(OH)_3$ 0.71 $Cr_2O_3$ wt. pts. | $NiCO_3$ 0.53 NiO wt. pts. | $Sb_2O_5$ 0.91 $Sb_2O_5$ wt. pts. | $WO_3$ wt. pts. | $Nb_2O_5$ wt. pts. |
|---|---|---|---|---|---|---|---|
| 1 | 79.9 | 1.5 |  |  | 6.3 |  |  |
| 2 | 79.9 | 1.5 |  |  |  | 7.7 |  |
| 3 | 79.9 | 1.5 |  |  |  |  | 4.7 |
| 4 | 79.9 | 1.5 |  |  | 3.2 | 3.9 |  |
| 5 | 79.9 | 1.5 |  |  | 3.2 |  | 2.4 |
| 6 | 79.9 | 1.5 |  |  |  | 3.9 | 2.4 |
| 7 | 79.9 | 1.5 |  |  | 2.1 | 2.6 | 1.6 |
| 8 | 79.9 |  | 7.2 |  | 17.6 |  |  |
| 9 | 79.9 |  |  | 4.1 | 7.0 |  |  |
| 10 | 79.9 | 2.8 |  | 2.1 | 14.3 |  |  |

Of the samples in Table 3 showing the compositions of the raw materials constituting them, the sample No. 1 is referred to. The predetermined amounts of raw materials for the sample No. 1 were mixed and dry-compounded in a vibrating ball mill (MB-1 Model; produced by Chuo Kako-ki Co.) for 3 hours. The containers used herein were nylon pots (3.0 liters); 5.0 kg of 25 mmφ-alumina balls were used as the grinding media; and the amount of the raw material mixture fed into the mill was 100 g.

Figure 9:
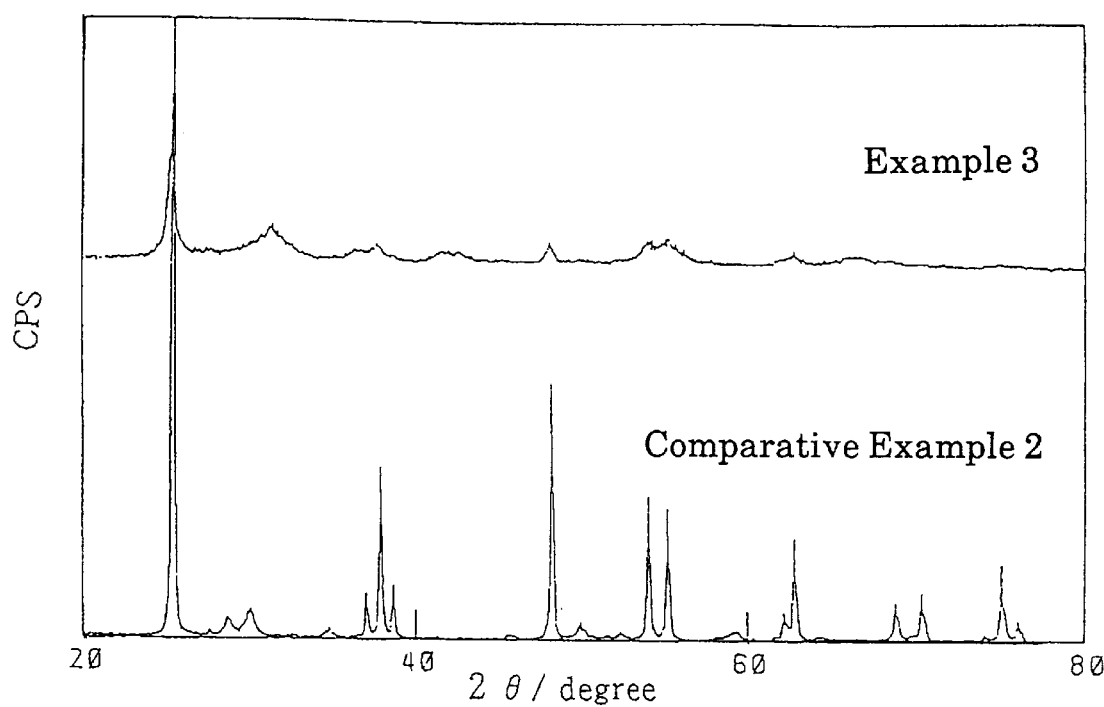
FIG. 9 shows the X-ray diffraction profiles of the powdery particles as obtained through the compounding treatment in Example 3 of the invention and the mixture as obtained through the mixing treatment in Comparative Example 2.

FIG. 9 shows an X-ray diffraction profile of the powdery particles as obtained through the above-mentioned treatment. From this, it is known that the product obtained herein comprised powdery particles resulting from promoted amorphatization of the raw materials.

Figure 10:
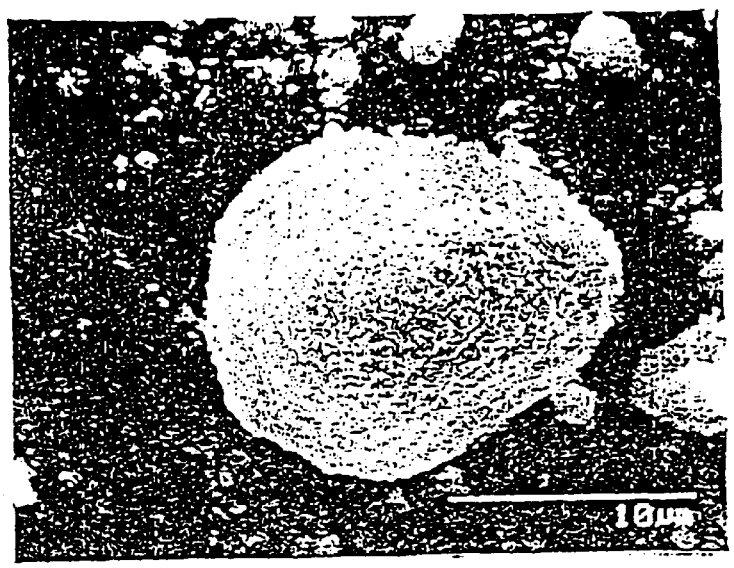
FIG. 10 is an electromicroscopic photograph of the surface of the particles as obtained through the compounding treatment in Example 3 of the invention, and is a substitute for the drawing of said particles.

FIG. 10 is an electromicroscopic photograph of the particles, in which it is observed that a plurality of raw material particles was firmly compounded to provide secondary particles.

Figure 11:
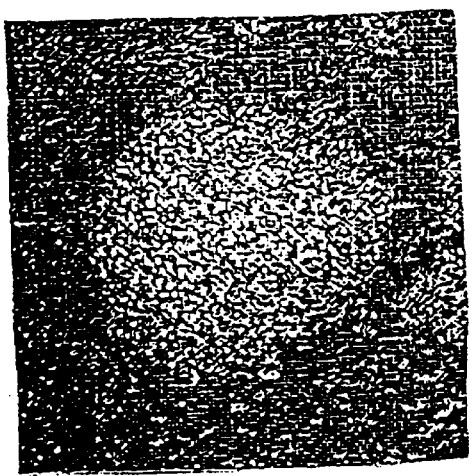
FIG. 11 is an X-ray image (EDX lateral analysis) of the particles as obtained through the compounding treatment in Example 3 of the invention, showing the distribution of titanium elements in the particles.
Figure 12:
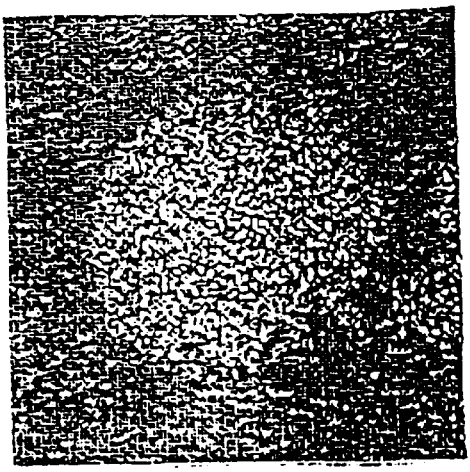
FIG. 12 is an X-ray image (EDX lateral analysis) of the particles as obtained through the compounding treatment in Example 3 of the invention, showing the distribution of cobalt elements in the particles.
Figure 13:
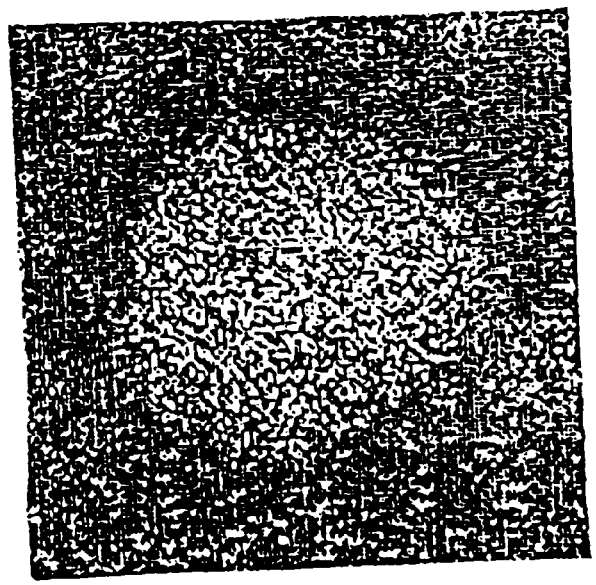
FIG. 13 is an X-ray image (EDX lateral analysis) of the particles as obtained through the compounding treatment in Example 3 of the invention, showing the distribution of antimony elements in the particles.

The product was subjected to EDX analysis. FIG. 11 to FIG. 13 are the resulting X-ray images, each showing the distribution of metal elements, titanium, cobalt and antimony, respectively. From these, it is understood that the secondary particles formed herein are composite particles comprising all the elements, titanium, cobalt, and antimony.

Thus, according to the method of the present invention of compounding the raw materials, obtained herein were composite particles consisting of well amorphatized and firmly compounded particles and comprising all the metal elements to be derived from the starting materials.

Figure 14:
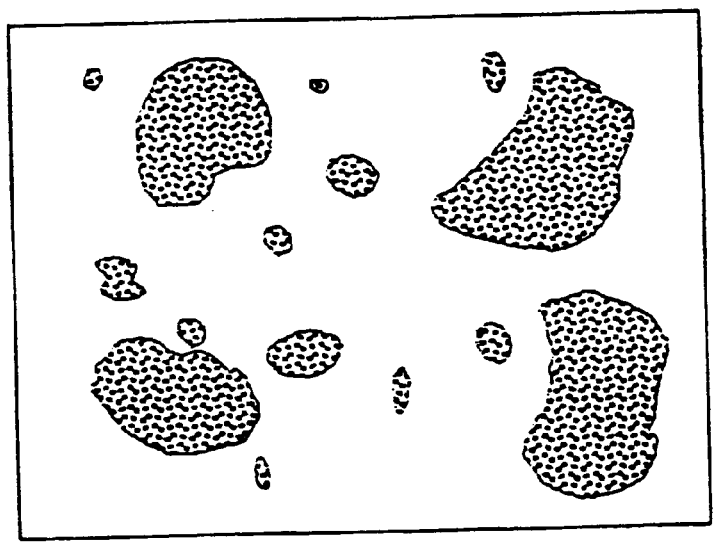
FIG. 14 is a view to graphically show the morphology of the powdery composite particles as obtained through the compounding treatment in Example 3 of the invention, based on the data of the EDX analyses of the particles.

FIG. 14 is a view to graphically show the morphology of the powdery composite particles obtained herein.

Next, the powdery composite particles were calcined in a roller hearth furnace or SiC electric furnace in air at from 800° C. to 1100° C. for 1 hour, and the colors of the resulting sintered products were measured in the same manner as in Example 1. The data obtained as a result of the color measurement were compared with the data in the CIELAB color system. Based on the comparison, the products obtained herein were evaluated.

Table 4 shows the heating temperature and time, and the data as determined on the basis of the CIELAB color system.

constituting the mixture with an electronic microscope verified that any secondary particles such as those seen in Example 3 were not formed in the mixture. As a result of EDX analysis of the mixture to check the distribution of the constitutive metal elements, it was found that the elements, titanium, cobalt and antimony all existed individually in the mixture.

From this data, therefore, it is understood that composite particles such as those in Example 3 could not be formed through the conventional mixing treatment.

FIG. 15 is a view to graphically show the morphology of the mixture obtained herein.

Next, the mixture having the composition of the sample No. 1 as obtained herein was calcined in a roller hearth furnace or SiC electric furnace in air at from 800° C. to 1100° C. for from 1 hour to 6 hours, and the colors of the resulting sintered products were measured in the same manner as in Example 3.

Table 4 shows the heating temperature and time, and the color data as determined on the basis of the CIELAB color system.

TABLE 4

| | Sample | Temperature (° C.) | Time (hr) | Color of Sintered Product (visual observation) | Values in CIELAB Color System | | |
|---|---|---|---|---|---|---|---|
| | | | | | L* | a* | b* |
| Example 3 | 1 | 800 | 1.0 | pale reddish yellow | 73.0 | 9.6 | 34.8 |
| | | 1000 | 1.0 | reddish yellow | 70.7 | 13.4 | 40.8 |
| | | 1100 | 1.0 | deep reddish yellow | 59.9 | 23.7 | 49.9 |
| Comparative | 1 | 800 | 1.0 | non-colored | — | — | — |
| Example 2 | | 1000 | 1.0 | pale yellow | 82.0 | 1.2 | −23.9 |
| | | 1100 | 1.0 | pale reddish yellow | 75.6 | 9.6 | 35.4 |
| | | 1100 | 6.0 | reddish yellow | 70.5 | 13.9 | 42.3 |

After having been calcined at 800° C. for 1 hour, the composite particles obtained herein through the compounding treatment produced a pigment uniformly colored in reddish yellow. However, the sample prepared according to the conventional process could not color at all, when calcined under said conditions. After having been calcined at higher temperatures, the pigments of the invention colored more deeply. When calcined at 1000° C. for 1 hour, the pigment of the invention exhibited a reddish yellow color. However, in order to obtain a pigment exhibiting the same reddish yellow color from a mixture as prepared according to the conventional process, the mixture had to be calcined at 1100° C. for 6 hours. In addition, when calcined at 1100° C. for 1 hour, the pigment of the invention exhibited a deep reddish yellow color. However, even when the mixture as obtained according to the conventional process, of which the composition was the same as that of the starting powdery mixture as processed according to the method of the invention, was calcined at the same temperature of 1100° C. for 6 hours or longer, the resulting pigment did not exhibit such a deep reddish yellow color.

Comparative Example 2

Predetermined amounts of the starting materials for the sample No. 1 in Table 3 were weighed and mixed in a Henschel mixer (Sample Mill; produced by Kyoritsu Riko Co.). The crystal structure of the resulting mixture of the sample No. 1 was analyzed through X-ray diffractometry, which verified that the mixture was not amorphatized at all, as in FIG. 9. The observation of the surfaces of the particles Compared with those obtained in Example 3, the pigments obtained herein were obviously uneven when the heating time for calcining was 1 hour. Regarding the degree of coloration of the pigments obtained herein as compared with those obtained in Example 3 under the same calcining conditions, the yellowish and reddish color of the former was poorer than that of the latter. In order to attain the degree of coloration on the same level as that of the pigments obtained in Example 3 through calcining at 1000° C. for 1 hour, the mixture in this Comparative Example 2 must be calcined at 1100° C. for 6 hours.

EXAMPLE 4

To prepare the samples Nos. 2 to 10 in Table 3, predetermined amounts of the raw materials were weighed and compounded in the same manner as in Example 3. The samples Nos. 2 to 10 thus obtained after the compounding treatment were all well-amorphatized and firmly-compounded composite particles comprising all the metal elements derived from the raw materials.

Next, the powdery composite particles of the samples Nos. 2 to 10 were calcined in a roller hearth furnace or SiC electric furnace in air at 1000° C. for 1 hour, and the colors of the resulting sintered products were measured in the same manner as in Example 3.

Table 5 shows the compositions of these samples, and the color data as determined on the basis of the CIELAB color system.

TABLE 5

|  | Sample No. | Composition | Color of Sintered Product (visual observation) | Values in CIELAB Color System | | |
|---|---|---|---|---|---|---|
|  |  |  |  | L* | a* | b* |
| Example 3 | 1 | Co—Sb—Ti | reddish yellow | 70.7 | 13.4 | 40.8 |
| Example 4 | 2 | Co—W—Ti | reddish yellow | 68.7 | 12.9 | 40.1 |
|  | 3 | Co—Nb—Ti | reddish yellow | 71.9 | 13.0 | 41.2 |
|  | 4 | Co—(Sb,W)—Ti | reddish yellow | 70.5 | 13.2 | 40.4 |
|  | 5 | Co(Sb,Nb)—Ti | reddish yellow | 72.1 | 13.3 | 39.7 |
|  | 6 | Co(W,Nb)—Ti | reddish yellow | 70.4 | 13.1 | 40.2 |
|  | 7 | Co—(Sb,W,Nb)—Ti | reddish yellow | 71.7 | 13.2 | 39.2 |
|  | 8 | Cr—Sb—Ti | reddish yellow | 71.8 | 11.7 | 54.8 |
|  | 9 | Ni—Sb—Ti | lemon yellow | 90.4 | 11.5 | 48.4 |
|  | 10 | (Co,Ni)—Sb—Ti | reddish yellow | 65.1 | 12.7 | 46.9 |
| Comparative Example 2 | 1 | Co—Sb—Ti | pale yellow | 82.0 | 1.2 | 23.9 |
| Comparative Example 3 | 2 | Co—W—Ti | pale yellow | 81.3 | 1.1 | 23.4 |
|  | 3 | Co—Nb—Ti | pale yellow | 83.6 | 1.4 | 24.1 |
|  | 4 | Co—(Sb,W)—Ti | pale yellow | 82.8 | 1.0 | 23.3 |
|  | 5 | Co(Sb,Nb)—Ti | pale yellow | 81.9 | 1.1 | 23.6 |
|  | 6 | Co(W,Nb)—Ti | pale yellow | 83.1 | 1.1 | 22.9 |
|  | 7 | Co—(Sb,W,Nb)—Ti | pale yellow | 83.4 | 1.2 | 23.1 |
|  | 8 | Cr—Sb—Ti | dark greenish yellow | 76.7 | −5.8 | 40.5 |
|  | 9 | Ni—Sb—Ti | pale lemon yellow | 91.8 | −13.0 | 38.1 |
|  | 10 | (Co,Ni)—Sb—Ti | pale yellow | 78.1 | 1.6 | 27.5 |

Calcining Condition: at 1000° C. for 1 hour

The pigment samples Nos. 2 to 7 all colored in an extremely uniform reddish yellow. These comprised tungsten and/or niobium, in place of or in addition to antimony, in the form of solid solution in rutile-structured titanium oxide. Like the sample obtained in Example 3, all these samples obtained herein through the compounding treatment were of good quality. The other pigment samples Nos. 8 to 10 also colored in an extremely uniform reddish yellow or lemon yellow. These comprised chromium or nickel, in place of or in addition to cobalt, in the form of solid solution in rutile-structured titanium oxide. As with the sample obtained in Example 3, all these samples obtained herein through the compounding treatment were of good quality.

Comparative Example 3

Predetermined amounts of the starting materials for the samples Nos. 2 to 10 in Table 3 were weighed and mixed in the same manner as in Comparative Example 2. It is understood, as in Comparative Example 2, that any composite particles such as those in Example 3 could not be formed through the conventional mixing treatment.

Next, the mixtures having the compositions of the samples Nos. 2 to 10 as obtained herein were calcined in a roller hearth furnace or SiC electric furnace in air at 1000° C. for 1 hour, and the colors of the resulting sintered products were measured in the same manner as in Example 3.

Table 5 shows the compositions of the samples, and the color data as determined on the basis of the CIELAB color system.

Compared with those obtained in Example 4, the pigment samples Nos. 2 to 10 obtained herein were obviously uneven and insufficiently colored.

EXAMPLE 5

Any of ethanol, propylene glycol, polycarboxylic acid (Disperon 2150; produced by Kusunoki Kasei Co.), triethanolamine, diethanolamine or monoethanolamine were used herein as an aid, directly or after having been diluted with ethanol to have a predetermined viscosity. These are referred to as aid (A) to aid (H). The same starting material mixture as for the sample No. 1 shown in Table 3 was compounded in the same manner as in Example 3, except that one of these aids (A) to (H) was added to the mill at the same time as 100 g of the mixture was put into the mill. In this, however, the processing time was from 0.5 hours to 2 hours; and the amount of the aid, one of aid (A) to aid (H), added was 1% by weight of the total amount of the mixture as the aid was fed into the mill. As the aid (H'), 10% by weight of the aid (H) was added to the mill.

Next, the powdery composite particles obtained through the above-mentioned process were calcined in a roller hearth furnace in air at 800C for 1 hour.

The degree of coloration of each sintered product was measured to evaluate the products.

In Table 6 are shown the components of the aids (A) to (H') used, their viscosity (centipoises at 20° C., and the degree of coloration of each sintered product.

TABLE 6

|  |  | Aid (organic substance/solvent) Relative to the total amount of the raw material mixture, 1 wt. % of A to H or 10 wt. % of H' was added. | Viscosity of Solution (20° C.) | Degree of Coloration relative to Processing Time | | | |
|---|---|---|---|---|---|---|---|
|  |  |  |  | 0.5 hrs | 1 hr | 1.5 hrs | 2 hrs |
|  | Example 3 | Not added |  | x | x | x | Δ |
|  | Example 5 | A. Ethanol | 1.2 cps | x | x | Δ | ○ |
|  |  | B. Propylene glycol/ethanol | 8 | x | x | Δ | ○ |

TABLE 6-continued

| Aid (organic substance/solvent) Relative to the total amount of the raw material mixture, 1 wt. % of A to H or 10 wt. % of H' was added. | Viscosity of Solution (20° C.) | Degree of Coloration relative to Processing Time | | | |
|---|---|---|---|---|---|
| | | 0.5 hrs | 1 hr | 1.5 hrs | 2 hrs |
| C. Monoethanolamine/ethanol | 110 | x | x | Δ | ○ |
| D. Diethanolamine/ethanol | 108 | x | Δ | ○ | ○ |
| E. Propylene glycol | 22 | x | Δ | ○ | ○ |
| F. Polycarboxylic acid (Disperon 2150) | 254 | Δ | ○ | ○ | ○ |
| G. Triethanolamine | 494 | Δ | ○ | ○ | ○ |
| H. Triethanolamine/ethanol | 266 | x | Δ | ○ | ○ |
| H'. 10 wt. % of H added | 266 | x | x | x | x |

○: Good
Δ: Relatively good
x: Bad
Calcining Condition: at 850° C. for 1 hour

When one of the aids (D) to (H) having a viscosity of falling between 10 centipoises and 500 centipoises and comprising an organic substance having two or more hydroxyl and/or carboxyl groups in one molecule was added, the same results as those in Example 3 were obtained herein through the compounding treatment for 1 hour or 1.5 hours. From this, it is understood that the addition of any of the aids (D) to (H) shortened the processing time, that is, reduced the energy needed for the processing, as compared with the case of Example 3 where no aid was added. For the other aids (A), (B) and (C), however, such significant improvements as in the use of the aids (D) to (H) could not be attained. This is because the aids (A) and (C) having only one hydroxyl group in one molecule have poor adsorbability onto the surfaces of the inorganic particles and could not act as binders. In other words, these aids could not directly assist the inorganic particles to compound together to provide the intended composite particles. On the other hand, even for organic substances having 2 or more hydroxyl groups in one molecule, such as the aid (B), they could not directly assist the inorganic particles in compounding together to provide the intended composite particles, if their viscosity was not suitable for them to act as binders.

Regarding the case of the aid (H') corresponding to the addition of 10% by weight of the aid (H), satisfactory coloration could not be obtained even after a compounding treatment of 2 hours. This is because, since the amount of the aid added was too large, most of the raw materials adhered, without being processed, onto the inner wall of the pot and onto the alumina balls in the initial stage of the compounding treatment step, and the adhered materials interfered with the subsequent treatment.

The following Examples 6 and 7 are to demonstrate the present invention as applied to the production of cobalt blue inorganic pigments.

EXAMPLE 6

A raw material mixture was prepared, comprising cobalt hydroxide and aluminum hydroxide in a ratio by mol of 1/0.30 in terms of aluminum/cobalt, and dry-compounded in a vibrating ball mill (MB-1 Model; produced by Chuo Kako-ki Co.) for 3 hours. The containers used herein were nylon pots (3.0 liters); 5.0 kg of 25 mmφ-alumina balls were used as the grinding media; and the amount of the raw material mixture fed into the mill was 200 g.

Figure 16:
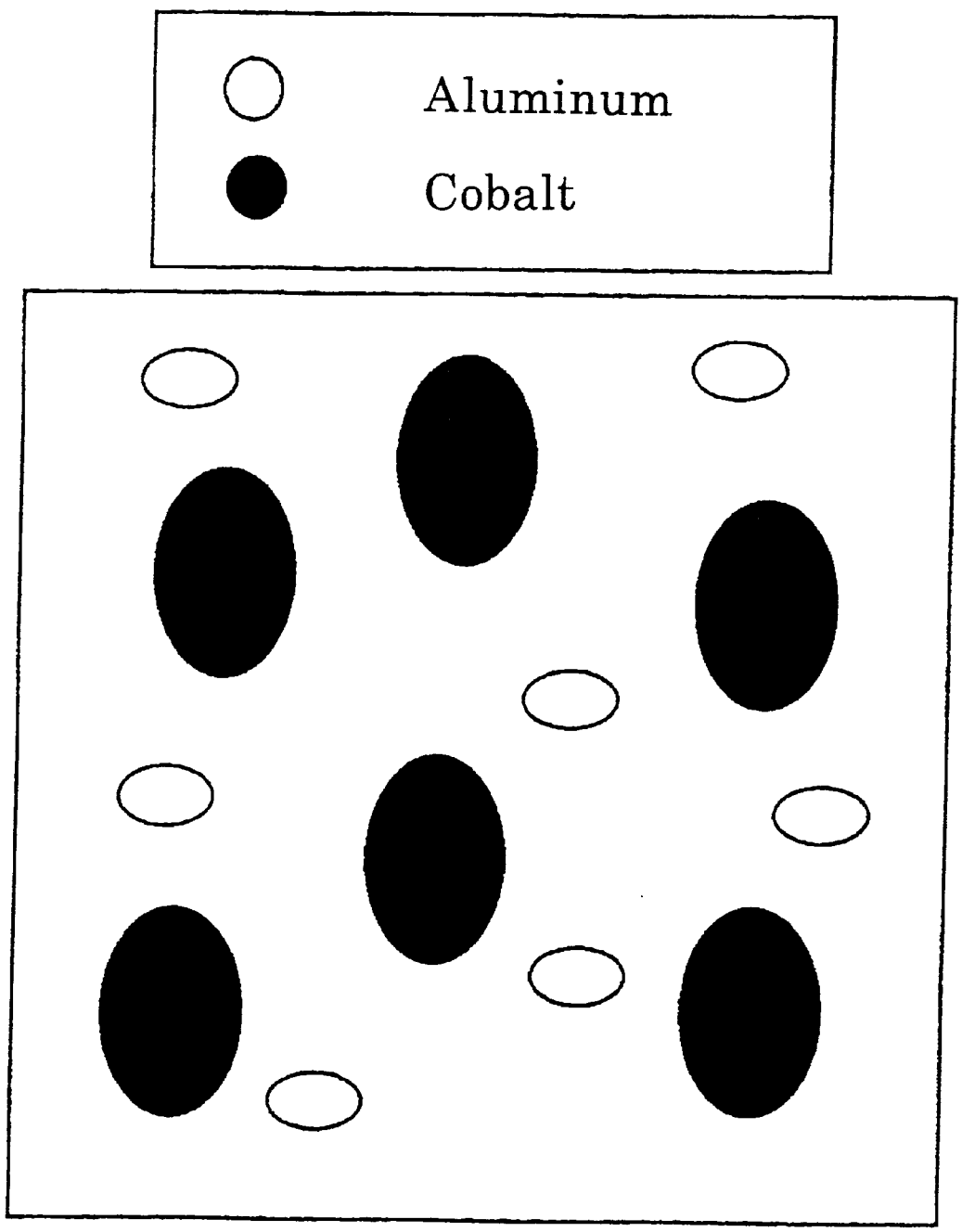
FIG. 16 is a view to graphically show the morphology of the non-compounded powdery particles, which were processed in Example 6 of the invention; and this is based on the data of the EDX analyses of the particles.
Figure 17:
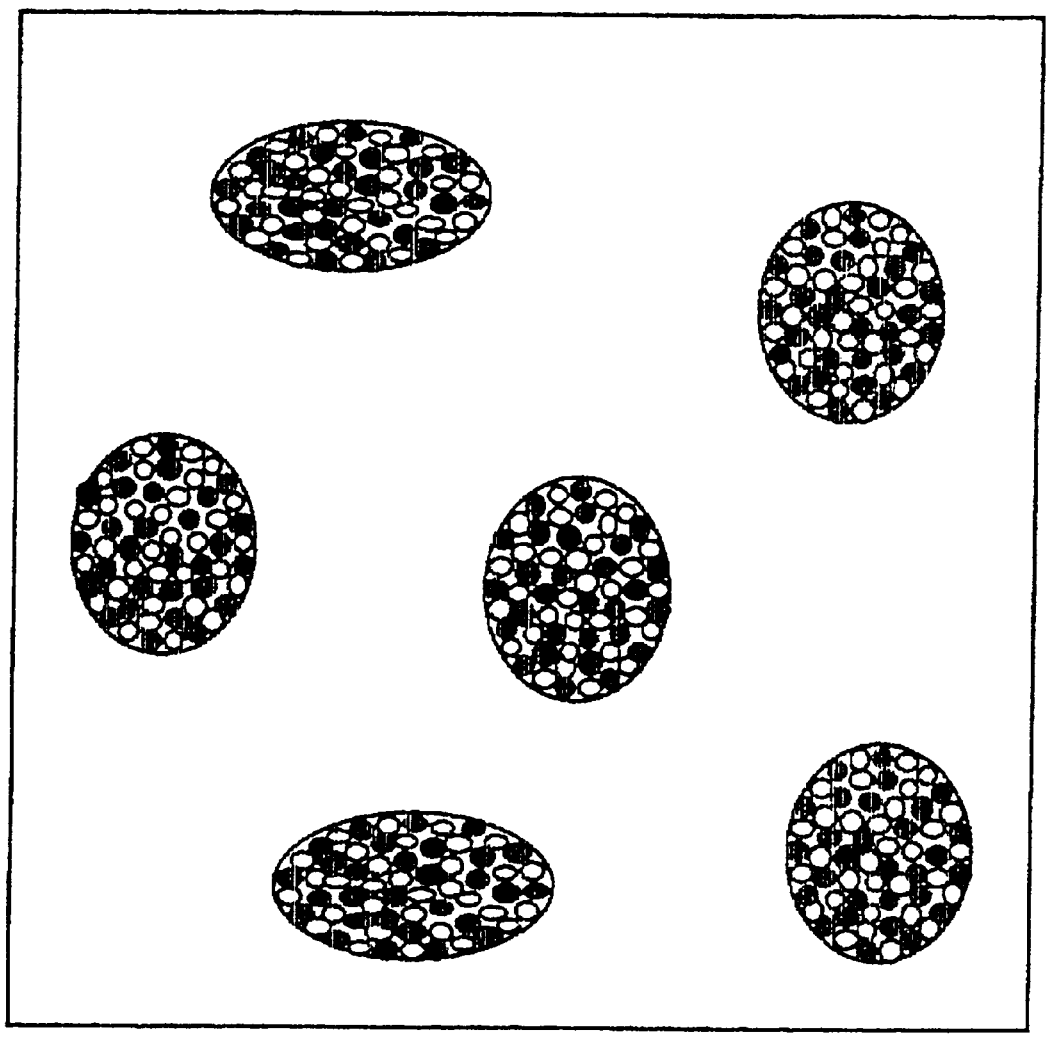
FIG. 17 is a view to graphically show the morphology of the powdery composite particles as obtained through the compounding treatment in Example 6 of the invention, based on the data of the EDX analyses of the particles.

The raw material mixture and the particulate product obtained from it through the compounding treatment were subjected to EDX analysis. FIG. 16 and FIG. 17 are views each graphically showing the distribution of the metal elements, cobalt and aluminum, in the raw material mixture and in the particulate product, respectively. From these, it is seen that the starting material mixture is a mere mixture of cobalt hydroxide particles and aluminum hydroxide particles, while the particulate product as obtained by compounding the starting material mixture is composed of composite particles each comprising cobalt and aluminum as uniformly dispersed therein.

Figure 18:
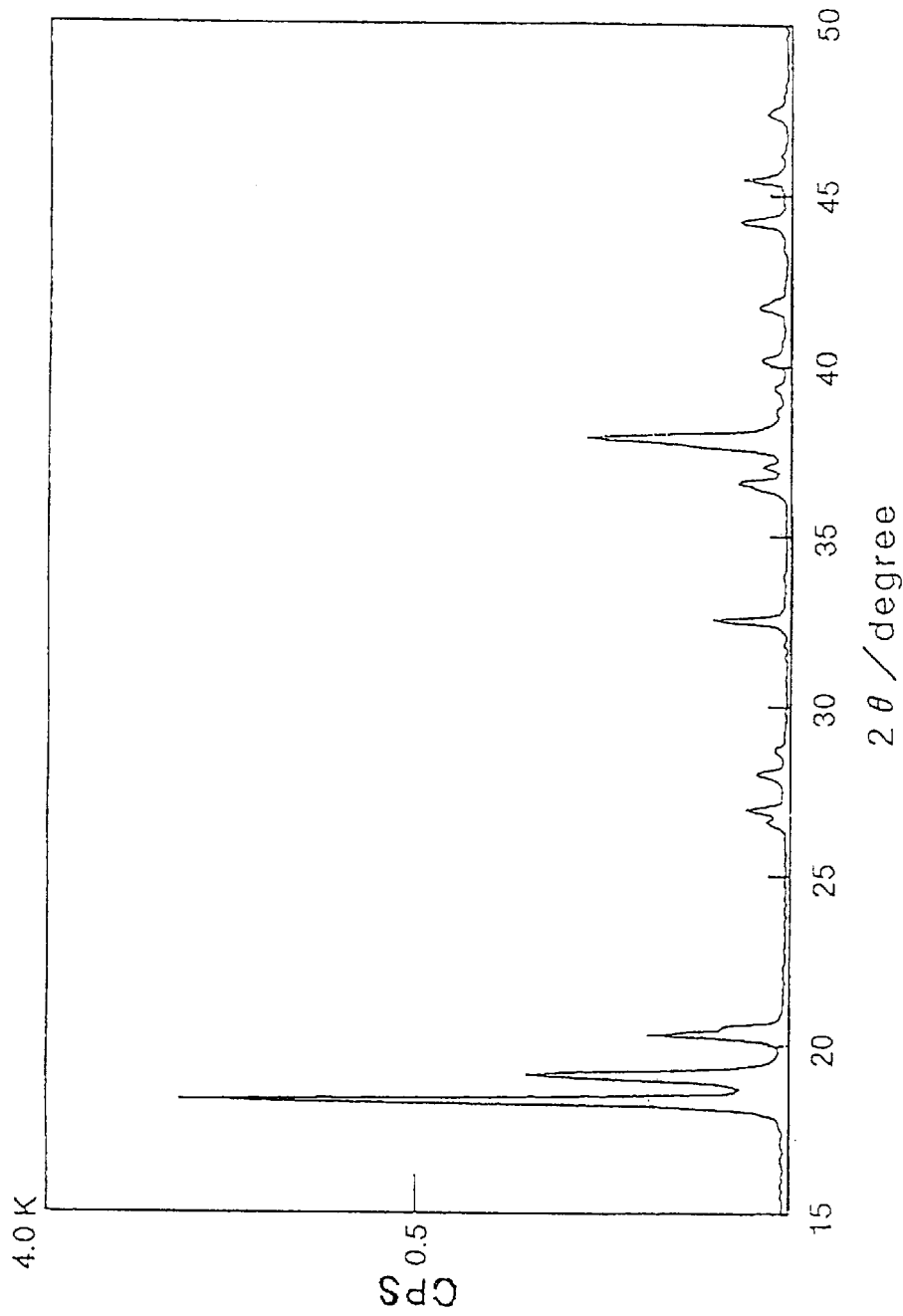
FIG. 18 is an X-ray diffraction profile of the non-compounded powdery particles, which were processed in Example 6 of the invention.
Figure 19:
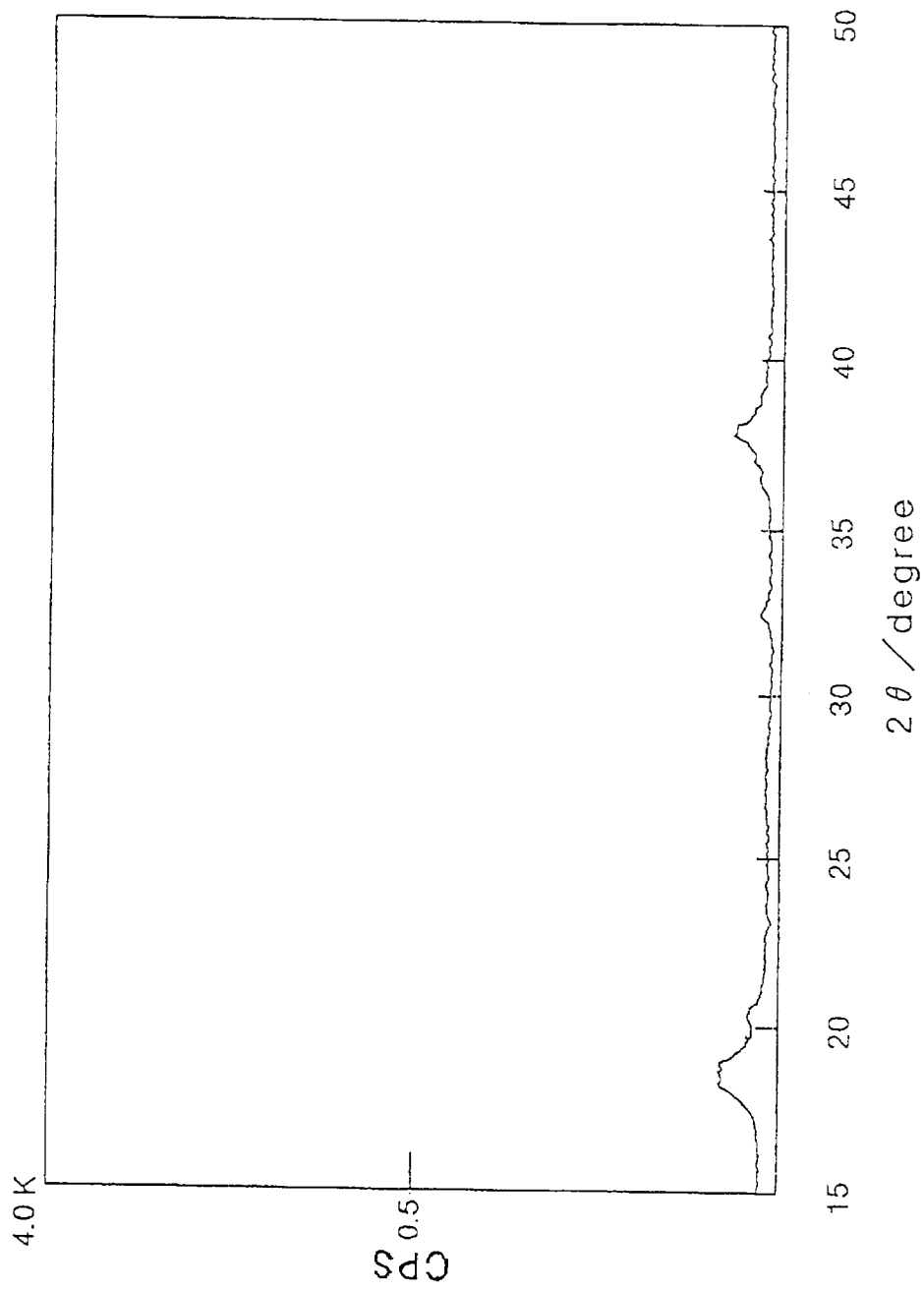
FIG. 19 is an X-ray diffraction profile of the powdery particles as obtained through the compounding treatment in Example 6 of the invention.

FIG. 18 and FIG. 19 are X-ray diffraction profiles of the non-compounded starting material mixture and the compounded particulate product, respectively. From these, it is known that the compounded particulate product comprises well-amorphatized composite particles.

Specifically, it is understood from this data that the composite particles as obtained herein through the above-mentioned compounding treatment are well-amorphatized composite particles comprising cobalt hydroxide and aluminum hydroxide in a predetermined ratio.

Next, the powdery composite particles obtained herein were calcined in a roller hearth furnace in air at 950° C. for 30 minutes. The resulting sintered product colored in dark blue. Since the product was obtained through calcining at such a low temperature and for such a short period of time, the particles did not grow too much and the product was not sintered excessively, resulting in particles that had almost the same size before and after sintering. Without being wet-ground, the sintered product was directly dry-ground to obtain a cobalt blue pigment.

Figure 20:
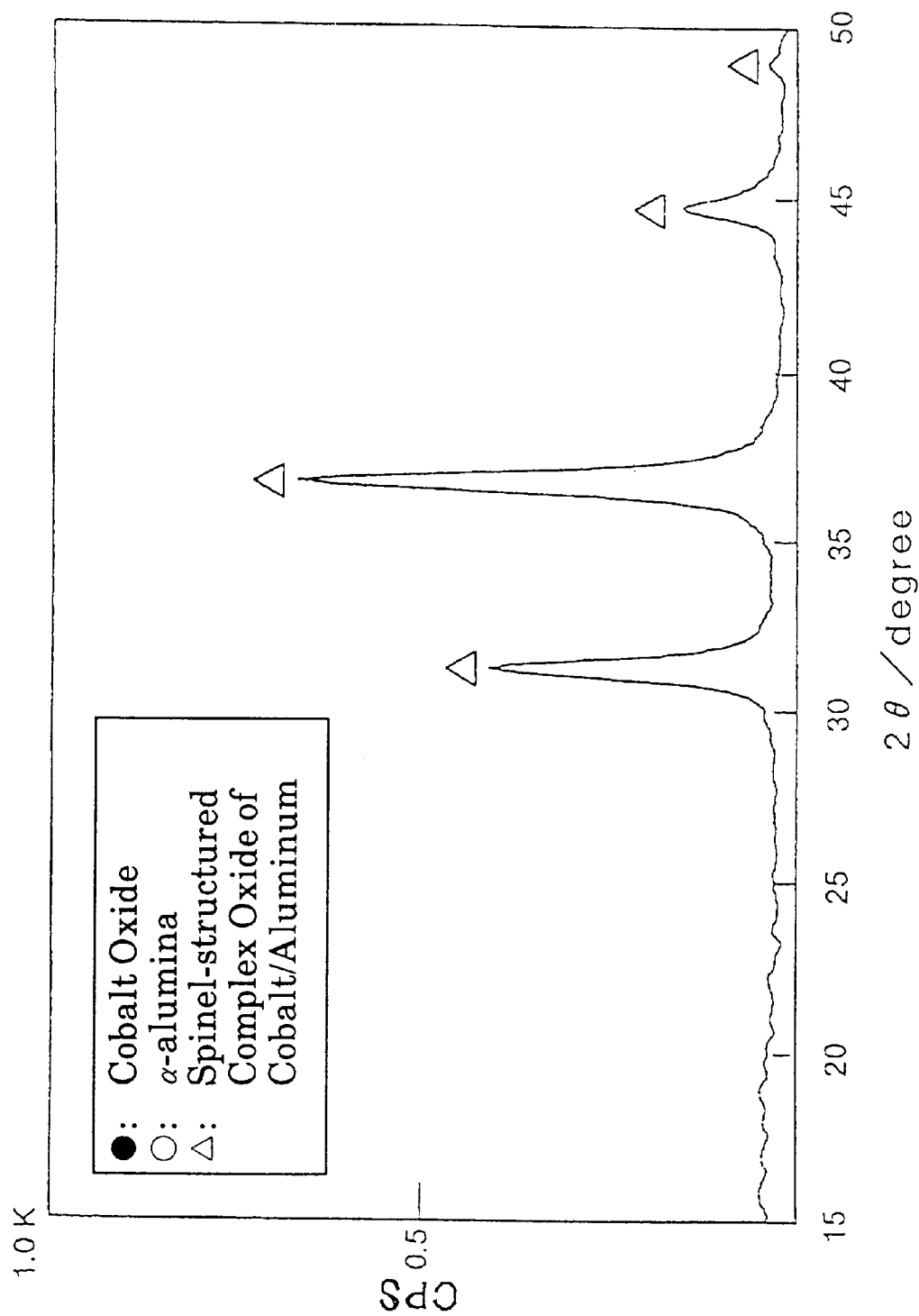
FIG. 20 is an X-ray diffraction profile of the cobalt blue pigment as obtained in Example 6 of the invention.

FIG. 20 is an X-ray diffraction profile of the cobalt blue pigment obtained herein. From this, it is known that, in this pigment, all cobalt elements existed in the form of spinel-structured complex oxide of cobalt/aluminum, while the remaining aluminum elements existed in the form of amorphous transition alumina having a low refractive index. The cobalt blue pigment was mixed with a vehicle, the mixture was spread over a base, and its color was measured. The process for the color measurement is as follows:

Process of Color Measurement:

The following components of the ratio by weight mentioned below were mixed in a small bottle (70 cc), and dispersed for 15 minutes using a paint shaker (5400 Model Paint Conditioner; produced by Red Devil Co.).

| | |
|---|---|
| Sample of the product (not larger than 1 μm in size) | 4 g |
| Glass beads (Unibeads UB-2527L; produced by Union Co.) | 45 g |
| Acrylic resin (Nippeacryl Autoclear Super) | 30 g |
| Thinner | 2 g |

The resulting dispersion was spread over art paper with black streaks printed thereon, using an applicator (150 μm), and its color was measured using a spectrophotometer (Colorcom System; produced by Dai-nichi Seika Kogyo Co.), while being compared with the CIELAB color system. Based on this comparison, the product obtained herein was evaluated.

Evaluation of Data of Color Measurement:

Lightness is represented by L*; and chromaticity indicating hue and chroma is represented by a* and b*. a* and b* are the data in different color directions. +a* is in a red direction; −a* is in a green direction; +b* is in an yellow direction; and −b* is in a blue direction. Larger absolute values of these data mean that the colors are more vivid. To evaluate colors themselves, referred to are the CIELAB color system data in the white area in the black streaks-printed art paper. On the other hand, the evaluation of the transparency of colors is effected as follows: L*, a* and b* in the white area in the black streaks-printed art paper are measured to be Lw, aw and bw, respectively, and L*, a* and b* in the black area in the same paper are measured to be Lb, ab and bb, respectively. The color difference, ΔE between the two is calculated according to the following equation, to be the index by the transparency of the color. The color having a larger value ΔE shall have a higher degree of transparency.

$$\Delta E = \sqrt{(Lw - Lb)^2 + (aw - ab)^2 + (bw - bb)^2}$$

The data of the pigment obtained herein is represented in accordance with the CIELAB color system, and was L*=35.09, a*=28.11 and b*=−68.57.

The value ΔE indicating its transparency was 53.43 and high. It has been found that, since this pigment has no cobalt oxide but comprises spinel-structured complex oxide of cobalt/aluminum only, it is a cobalt blue pigment coloring in light, reddish, deep blue. In addition, it has been found that, since the remaining aluminum exists in this pigment in the form of amorphous transition alumina having a low refractive index, the pigment has good transparency.

Comparative Example 4

As in Example 6, a raw material mixture was prepared, comprising cobalt hydroxide and aluminum hydroxide in a ratio by mol of 1/0.30 in terms of aluminum/cobalt. In this, however, the resulting mixture was wet-milled in a rotary ball mill (pot mill) under the conditions mentioned below. An alumina pot (3.5 liters) was used as the container; 4 kg of 25 mmφ-alumina balls were used as the grinding media; and 200 g of the mixture was put into the pot along with 1.1 liters of water. The mixture was wet-milled continuously for 24 hours, and the resulting slurry was dried at 110° C.

FIG. 21 is a view to graphically show the morphology of the mixture as obtained through the wet-grinding treatment herein, based on the data of the EDX analyses of the mixture. As in this, it is known that the elements of cobalt and aluminum did not exist in one and the same particle.

Referring to the X-ray diffraction profile of the wet-milled mixture, peaks are sharp and strong, as in the X-ray diffraction profile of the non-compounded mixture in Example 6. From this, it is understood that the mixture obtained herein was not well amorphatized.

After having been calcined under the same conditions as in Example 6, the resulting product did not color in blue. In order to obtain a blue product from this mixture, the mixture had to be calcined at a temperature not lower than 1200° C., preferably at 1250° C. for about 3 hours. Therefore, this mixture was calcined at 1250° C. for 3 hours. The resulting product was overly sintered and contained overly large particles.

Therefore, in order to obtain a pigment, this sintered product had to be further wet-ground. After having been wet-ground, this was dried and further dry-ground to obtain a cobalt blue pigment.

Figure 22:
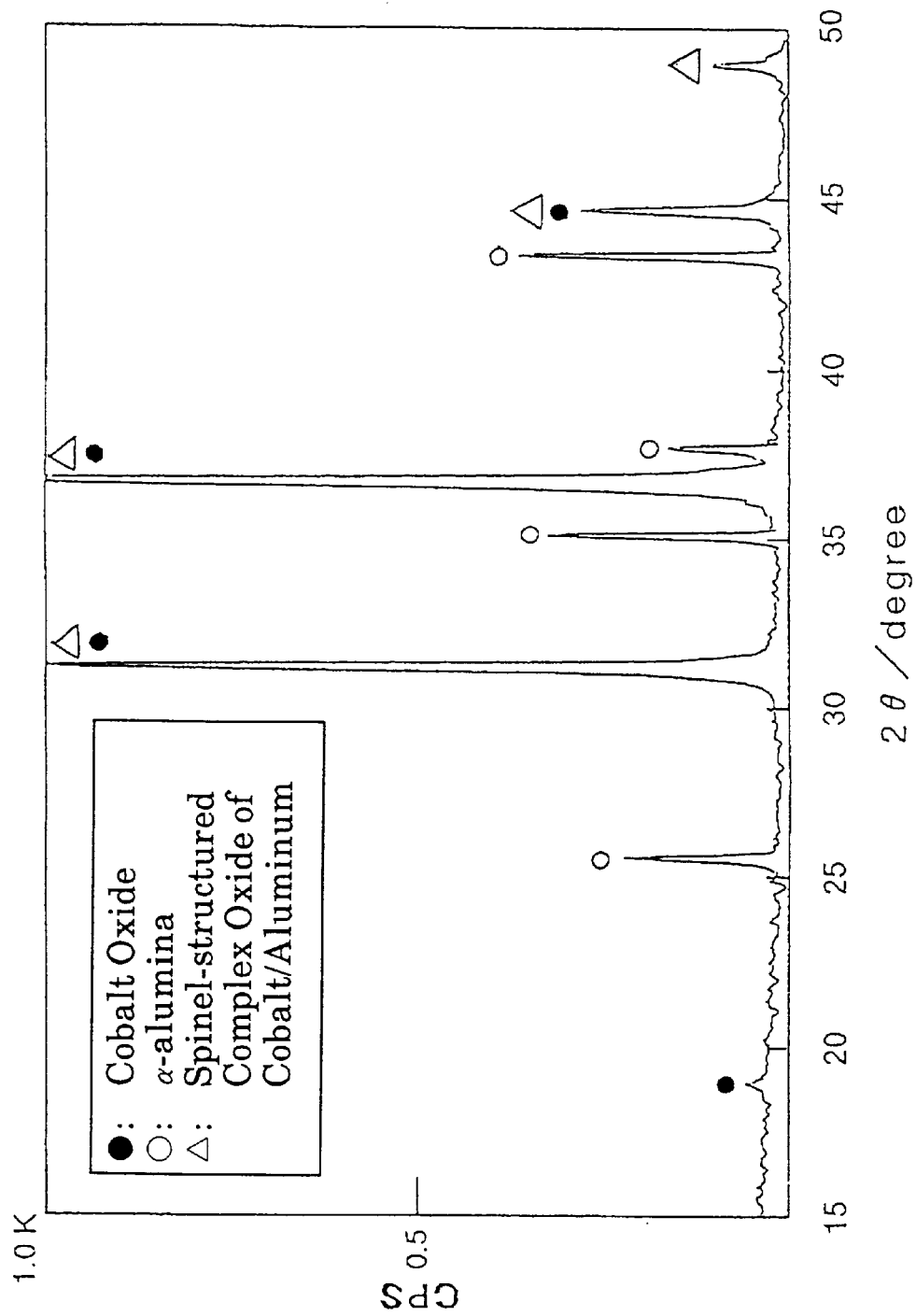
FIG. 22 is an X-ray diffraction profile of the cobalt blue pigment as obtained in Comparative Example 4.

FIG. 22 is an X-ray diffraction profile of the cobalt blue pigment thus obtained herein. From this, it is known that the pigment comprises a spinel-structured complex oxide of cobalt/aluminum, cobalt oxide and α-alumina. Accordingly, it is understood that, in this pigment, a part of the cobalt exists in the form of the spinel-structured complex oxide of cobalt/aluminum while the other exists as cobalt oxide, and the remaining aluminum exists as α-alumina having a high degree of crystallinity and a high refractive index.

The color of this pigment was measured and represented according to the CIELAB color system. The data was L*=33.96; a*=19.38; and b*=−59.83. The ΔE value of this pigment indicating its transparency was 28.26. This pigment could be used as a blue pigment. However, this pigment obtained herein comprises α-alumina in addition to the spinel-structured complex oxide of cobalt/aluminum, since the heating temperature was quite high as compared with the temperature in Example 6. Therefore, it is known that the pigment obtained herein is of lower quality than the cobalt blue pigment obtained in Example 6, in that the former was more greenish and more cloudy and had lower transparency than the latter.

Comparative Example 5

The same starting material mixture as that in Example 6 was prepared and compounded under the same conditions as in Example 6.

Next, the resulting powdery composite particles were calcined at 800° C. for 2 hours to give a blackish blue product. Like that in Example 6, the product obtained herein was not excessively sintered and therefore had no overly large particles, since it was calcined at such a low temperature and for such a short period of time. The size of the non-sintered particles was almost the same as that of the sintered particles. Without being wet-ground, the sintered product was directly dry-ground to obtain a cobalt blue pigment. This pigment was subjected to X-ray diffractometry. In the resulting X-ray diffraction profile of this pigment, peaks for spinel-structured complex oxide of cobalt/aluminum and those for cobalt oxide appeared with no peaks for alumina. From this, it is known that, in this pigment, part of cobalt and aluminum elements existed in the form of a spinel-structured complex oxide of cobalt/aluminum while the remaining cobalt elements existed as cobalt oxide and the remaining aluminum elements existed in the form of amorphous transition alumina having a low refractive index.

The color data of the pigment obtained herein is represented in accordance with the CIELAB color system, and was L*=24.21, a*=10.39 and b*=−40.53. Comprising cobalt oxide in addition to the spinel-structured complex oxide of cobalt/aluminum, this pigment is much more greenish but is less bluish than the pigment obtained in Example 6. Therefore, the pigment obtained herein is unsuitable as a blue pigment. This is because, since the composite particles were calcined at such a low temperature of 800° C., the coloration of the sintered product was poor. Accordingly, it has been found that the composite particles must be calcined at 850° C. or higher in order to produce a pigment capable of being used as a blue pigment.

Comparative Example 6

The same starting material mixture as that in Example 6 was prepared and compounded under the same conditions as in Example 6. Next, the resulting powdery composite particles were calcined at 1100° C. for 30 minutes to produce a dark blue product. The product obtained herein was not too excessively sintered and therefore had no overly large particles, since it was calcined for such a short period of time. The size of the sintered particles was almost the same as that of the non-sintered particles. Without being wet-ground, the sintered product was directly dry-ground to obtain a cobalt blue pigment.

This pigment was subjected to X-ray diffractometry. In the resulting X-ray diffraction profile of this pigment, peaks for spinel-structured complex oxide of cobalt/aluminum and those for α-alumina appeared with no peaks for cobalt oxide. From this, it is known that, in this pigment, all cobalt elements existed in the form of a spinel-structured composite oxide of cobalt/aluminum while the remaining aluminum elements existed in the form of α-alumina having a high refractive index.

The color data of the pigment obtained herein is represented in accordance with the CIELAB color system, and was L*=33.14, a*=20.18 and b*=−60.83. The value ΔE of this pigment indicating its transparency was 36.68. This pigment could be used as a blue pigment. However, this pigment obtained herein comprises α-alumina in addition to the spinel-structured complex oxide of cobalt/aluminum, since the heating temperature for sintering it was quite high as compared with the temperature in Example 6. Therefore, it is known that the pigment obtained herein is of lower quality than the cobalt blue pigment obtained in Example 6, in that the former was more greenish and more cloudy and had lower transparency than the latter.

EXAMPLE 7

A raw material mixture was prepared, comprising cobalt carbonate and γ-alumina in a ratio by mol of 1/0.30 in terms of aluminum/cobalt, and compounded under the same conditions as in Example 6.

The resulting particulate product was subjected to X-ray diffractometry and EDX analysis, and the surfaces of the particles constituting them were observed with an electronic microscope. As a result of these, it has been found that the particulate product obtained herein comprises well-amorphatized composite particles in a predetermined ratio of cobalt to aluminum, like the product obtained in Example 6.

Next, the powdery composite particles obtained herein were calcined at 950° C. for 30 minutes. The resulting sintered product colored in dark blue. Since the product was obtained through calcining at such a low temperature and for such a short period of time, the particles did not grow too much and the product was not sintered excessively, resulting in particles that had almost the same size before and after the sintering. Without being wet-ground, the sintered product was directly dry-ground to obtain a cobalt blue pigment.

This pigment was subjected to X-ray diffractometry. In the resulting X-ray diffraction profile, seen were peaks only for spinel-structured complex oxide of cobalt/aluminum with neither peaks for cobalt oxide nor those for α-alumina. From this, it is understood that, in this pigment, all cobalt elements, after having been compounded completely, existed in the form of a spinel-structured complex oxide of cobalt/aluminum, while the remaining aluminum elements existed in the form of amorphous transition alumina having a low refractive index.

The color data of the pigment obtained herein is represented in accordance with the CIELAB color system, and was L*=34.63, a*=27.98 and b*=−67.40. The value ΔE of this pigment indicating its transparency was 52.68 and high. It has been found that, since this pigment has no cobalt oxide, but comprises spinel-structured complex oxide of cobalt/aluminum only, it is a cobalt blue pigment coloring in light, reddish, deep blue. In addition, it has been found that, since the remaining aluminum exists in this pigment in the form of amorphous transition alumina having a low refractive index, the pigment has good transparency.

Comparative Example 7

Raw material mixtures were prepared, each comprising any of A) cobalt hydroxide and α-alumina, B) cobalt oxide and aluminum hydroxide, or C) cobalt oxide and α-alumina, in a ratio by mol of 1/0.30 in terms of aluminum/cobalt, and compounded under the same conditions as in Example 6.

The resulting particulate products were subjected to X-ray diffractometry and EDX analysis, and the surfaces of the particles constituting them were observed with an electronic microscope. As a result of these, it has been found that the particulate products obtained herein all comprise well-amorphatized composite particles in a predetermined ratio of cobalt to aluminum, like the product obtained in Example 6.

Next, these powdery composite particles obtained herein were calcined at 950° C. for 30 minutes under the same conditions as in Example 6. However, the resulting sintered products from A), B) and C) all colored in blackish blue, and were not suitable as blue pigments. This is because the heating temperature for sintering, 950° C. was too low to attain good coloration. In order to obtain good blue pigments from these particulate products, the products had to be calcined at a higher temperature for a longer period of time as compared with the product in Example 6. Concretely, the product from A) required calcining at 1100° C. for 2 hours; that from B) required calcining at 1100° C. for 1 hour; and that from C) required calcining at 1150° C. for 2 hours. The pigments thus obtained from these A), B) and C) after having been sintered under such satisfactory conditions were subjected to X-ray diffractometry. In their X-ray diffraction profiles, seen were peaks for spinel-structured complex oxide of cobalt/aluminum, those for cobalt oxide and those for α-alumina. From these, it is understood that, in these pigments, part of the cobalt and aluminum elements existed in the form of a spinel-structured complex oxide of cobalt/aluminum, while the remaining cobalt elements existed as cobalt oxide and the remaining aluminum elements existed in the form of α-alumina having a high degree of crystallinity and a low refractive index.

The color data of these pigments is shown in Table 7.

TABLE 7

|  | Cobalt Source | Aluminum Source | Calcining Condition | Compounds in Pigment | L* | a* | b* | ΔE |
|---|---|---|---|---|---|---|---|---|
| Example 6 | cobalt hydroxide | aluminum hydroxide | 950° C./30 min | complex oxide, transition alumina | 35.09 | 28.11 | −68.57 | 53.43 |
| Example 7 | basic cobalt carbonate | γ-alumina | 950° C./30 min | complex oxide, transition alumina | 34.63 | 27.98 | −67.4 | 52.64 |
| Comparative Example 7 A) | cobalt hydroxide | α-alumina | 1100° C./2 hr | complex oxide, cobalt oxide, α-alumina | 34.59 | 21.17 | −57.64 | 35.52 |
| Comparative Example 7 B) | cobalt oxide | aluminum hydroxide | 1100° C./1 hr | complex oxide, cobalt oxide, α-alumina | 32.66 | 19.38 | −58.43 | 30.55 |
| Comparative Example 7 C) | cobalt oxide | α-alumina | 1150° C./2 hr | complex oxide, cobalt oxide, α-alumina | 33.28 | 29.51 | −58.38 | 36.73 |

These pigments could be used as blue pigments. However, these comprise α-alumina in addition to the spinel-structured complex oxide of cobalt/aluminum, since the heating temperature for sintering them was quite high as compared with the temperature in Example 6. Therefore, it is known that these pigments are of lower quality than the cobalt blue pigment obtained in Example 6, in that the former were more greenish and more cloudy and had lower transparency than the latter.

We claim:

1. A method for producing inorganic pigments, which comprises mixing oxides of elements to constitute said inorganic pigments, or compounds that can be converted into such oxides under heat, in predetermined ratios, followed by calcining the resulting mixtures, and which is characterized in that;

the raw materials are dry-processed in a grinding machine, without being subjected to said mixing step, to thereby give to the raw materials sufficient energy enough to induce the mechanochemical reaction of the materials to compound them into composite particles comprising the raw materials in the compounding ratios.

2. A method for producing green inorganic pigments, which comprises mixing titanium oxide or metatitanic acid with oxides of elements of cobalt, nickel and zinc, or with compounds that can be converted into such oxides under heat, in predetermined ratios, followed by calcining the resulting mixtures, and which is characterized in that;

the raw materials are dry-processed in a grinding machine, without being subjected to said mixing step, to thereby give to the raw materials sufficient energy enough to induce the mechanochemical reaction of the materials to compound them into composite particles comprising the elements of titanium, cobalt, nickel and zinc in the compounding ratios, and the resulting composite particles are calcined at a temperature falling between 850° C. and 1050° C.

3. The method for producing green inorganic pigments as claimed in claim 2, wherein cobalt hydroxide is used as the cobalt source and nickel carbonate as the nickel source in the raw material mixture.

4. A method for producing yellow inorganic pigments, which comprises mixing titanium oxide or metatitanic acid with one or more of oxides of cobalt, chromium and nickel or compounds that can be converted into such oxides under heat, and with one or more of oxides of antimony, tungsten and niobium or compounds that can be converted into such oxides under heat, in predetermined ratios, followed by calcining the resulting mixtures, and which is characterized in that;

the raw materials are dry-processed in a grinding machine, without being subjected to said mixing step, to thereby give to the raw materials sufficient energy enough to induce the mechanochemical reaction of the materials to compound them into composite particles that comprise the metal elements constituting the raw materials, in the compounding ratios, and the resulting composite particles are calcined at a temperature falling between 800° C. and 1100° C.

5. The method for producing yellow inorganic pigments as claimed in claim 4, wherein cobalt hydroxide is used as the cobalt source, chromium hydroxide as the chromium source and nickel carbonate as the nickel source in the raw material mixture.

6. A method for producing cobalt blue pigments, which comprises mixing raw materials comprising cobalt hydroxide or cobalt carbonate as the cobalt source and aluminum hydroxide or γ-alumina as the aluminum source, in predetermined ratios, followed by calcining the resulting mixtures, and which is characterized in that;

the raw materials are dry-processed in a grinding machine, without being subjected to said mixing step, to thereby give to the raw materials sufficient energy enough to induce the mechanochemical reaction of the materials to compound them into composite particles comprising the two metal elements of cobalt and aluminum in the compounding ratios, and the resulting composite particles are calcined at a temperature falling between 850° C. and 1050° C. to give a cobalt blue pigment with good transparency.

7. The method for producing inorganic pigments as claimed in any one of claims 1 to 6, wherein an organic substance having 2 or more hydroxyl groups in one molecule, or 2 or more carboxyl groups in one molecule, or 2 or more, in total, of hydroxyl and carboxyl groups in one molecule is, after having been formed into its solution having a viscosity at room temperature (20° C.) of from 10 centipoises to 500 centipoises, added to the grinding machine in which the raw materials are being dry-processed, in an amount of from 0.05% by weight to 5.0% by weight relative to the total amount of the raw materials fed into the machine.

* * * * *